United States Patent
Bellamkonda et al.

(10) Patent No.: US 11,641,589 B2
(45) Date of Patent: *May 2, 2023

(54) CONTEXTUALIZED NETWORK OPTIMIZATION

(71) Applicant: Verizon Patent and Licensing Inc., Arlington, VA (US)

(72) Inventors: Krishna K. Bellamkonda, McKinney, TX (US); Vijay T. Madhav, Folsom, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 270 days.

This patent is subject to a terminal disclaimer.

(21) Appl. No.: 16/588,018

(22) Filed: Sep. 30, 2019

(65) Prior Publication Data

US 2020/0029230 A1    Jan. 23, 2020

Related U.S. Application Data

(63) Continuation of application No. 15/899,845, filed on Feb. 20, 2018, now Pat. No. 10,484,892.

(51) Int. Cl.
| | |
|---|---|
| *H04W 24/02* | (2009.01) |
| *H04W 24/04* | (2009.01) |
| *H04W 16/18* | (2009.01) |
| *H04L 41/12* | (2022.01) |
| *H04W 74/08* | (2009.01) |
| *H04W 88/08* | (2009.01) |

(52) U.S. Cl.
CPC ............. *H04W 24/02* (2013.01); *H04L 41/12* (2013.01); *H04W 16/18* (2013.01); *H04W 24/04* (2013.01); *H04W 74/0833* (2013.01); *H04W 88/08* (2013.01)

(58) Field of Classification Search
CPC ..... H04W 24/02; H04W 16/18; H04W 24/04; H04W 74/0833; H04W 88/08; H04L 41/12
See application file for complete search history.

(56) References Cited

U.S. PATENT DOCUMENTS

| | | | |
|---|---|---|---|
| 2008/0227455 A1* | 9/2008 | Kim | H04W 36/00835 455/436 |
| 2012/0122512 A1* | 5/2012 | Nammi | H04W 52/243 455/522 |

(Continued)

*Primary Examiner* — Luat Phung

(57) ABSTRACT

A computer device may include a memory configured to store instructions and a processor configured to execute the instructions to classify a plurality of base station sectors into a plurality of context categories based on a context that includes a measure of cell density and a measure of mobility. The processor may be further configured to select a context category from the plurality of context categories; determine a coverage and quality optimization parameter adjustment, a capacity optimization parameter adjustment, and a accessibility optimization parameter adjustment for a subset of the base station sectors classified in the selected context category; and instruct base stations associated with the subset of base station sectors to implement the coverage and quality optimization parameter adjustment, the capacity optimization parameter adjustment, and the accessibility optimization parameter adjustment.

20 Claims, 12 Drawing Sheets

(56) References Cited

U.S. PATENT DOCUMENTS

| | | | |
|---|---|---|---|
| 2013/0023217 A1* | 1/2013 | Zhuang | H04W 16/10 455/63.1 |
| 2013/0272132 A1* | 10/2013 | Heo | H04W 76/19 370/236.2 |
| 2014/0376374 A1* | 12/2014 | Moser | H04W 24/02 370/235 |
| 2016/0262038 A1* | 9/2016 | Dunn | H04W 24/02 |
| 2017/0055186 A1* | 2/2017 | Donepudi | H04W 4/026 |
| 2017/0318479 A1* | 11/2017 | Cotanis | H04L 43/16 |

\* cited by examiner

1002 →

| SECTOR 1020 | DENSITY 1022 | MOBILITY 1024 | INDOOR 1026 | DRONE USE 1028 |
|---|---|---|---|---|
| A | MEDIUM | HIGH | YES | NO |
| B | LOW | LOW | NO | NO |
| C | HIGH | HIGH | NO | NO |

| DENSITY 1050 | VERY HIGH | HIGH | MEDIUM | LOW |
|---|---|---|---|---|
| QUALITY AND COVERAGE OPTIMIZATION 1060 | | | | |
| QUALITY 1062 | 1 | 1 | 1 | 0.25 |
| COVERAGE 1064 | 0.25 | 0.5 | 1 | 1 |
| CAPACITY OPTIMIZATION 1070 | | | | |
| OFFSET 1072 | HIGH | HIGH | LOW | LOW |
| ACCESSIBILITY OPTIMIZATION 1080 | | | | |
| PRACH FORMAT 1082 | SHORT | SHORT | MEDIUM | LONG |

| VERY HIGH/HIGH DENSITY 1110 |||||
|---|---|---|---|
| MOBILITY 1120 | HIGH/MEDIUM MOBILITY | INTER/INTRA MOBILITY | DRONE |
| QUALITY OPTIMIZATION 1122 | NO | NO | NO |
| COVERAGE OPTIMIZATION 1124 | NO | NO | NO |
| CAPACITY OPTIMIZATION 1126 | NO | LOW | NO |
| MOBILITY OPTIMIZATION 1128 | HIGH | HIGH | HIGH |

| VERY HIGH/HIGH DENSITY 1110 |||||
|---|---|---|---|
| SUBSCRIBER TYPE 1130 | INDOOR | IoT | INDOOR + INTER MOBILITY |
| CAPACITY OPTIMIZATION 1132 | NO | NO | LOW |
| ACCESSIBILITY OPTIMIZATION 1134 | HIGH | NO | NO |
| MOBILITY OPTIMIZATION 1136 | NO | NO | HIGH |

FIG. 11B

CONTEXTUALIZED NETWORK OPTIMIZATION

CROSS REFERENCE TO RELATED APPLICATIONS

This patent application is a continuation of U.S. patent application Ser. No. 15/899,845, filed on Feb. 20, 2018, the contents of which are hereby incorporated by reference in their entirety.

BACKGROUND INFORMATION

In order to satisfy the needs and demands of users of mobile communication device users, providers of wireless communication services continue to improve and expand available services as well as networks used to deliver such services. One aspect of such improvements includes the development of wireless access networks as well as options to utilize such wireless access networks. The provider may manage a large number of wireless access networks and a particular wireless access network may manage and service a large number of devices. In order to maintain quality of service across a network, or across multiple networks, the provider may need to take into account various conditions that vary across networks and/or devices.

BRIEF DESCRIPTION OF THE DRAWINGS

FIGS. 10A-10C are diagrams of an exemplary contextual optimization according to an implementation described herein; and FIGS. 11A and 11B are diagrams of an exemplary tiered contextual optimization according to an implementation described herein.

DETAILED DESCRIPTION OF PREFERRED EMBODIMENTS

Figure 1:
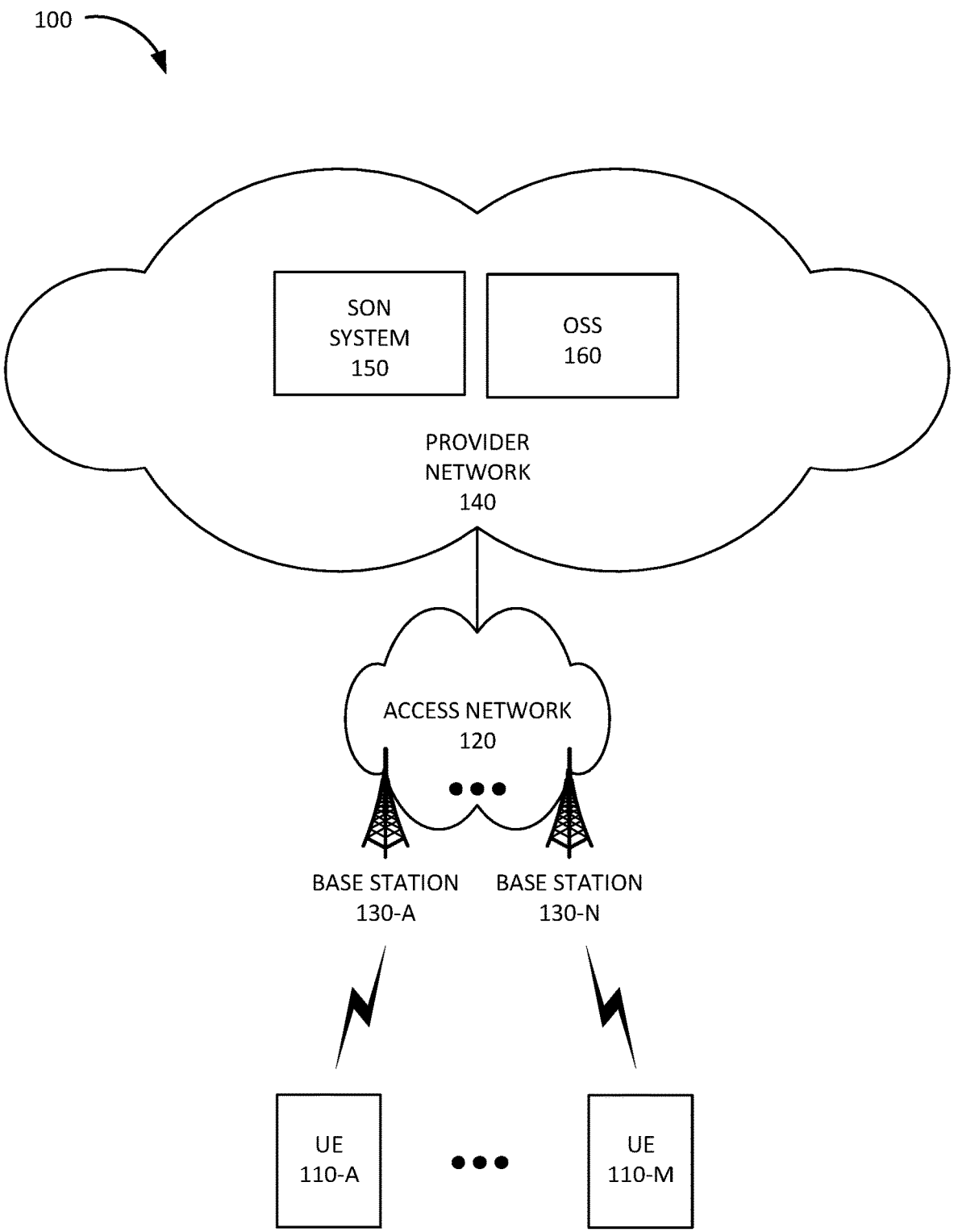
FIG. 1 is a diagram illustrating an environment according to an implementation described herein.

The following detailed description refers to the accompanying drawings. The same reference numbers in different drawings identify the same or similar elements.

A wireless access network may enable wireless communication devices to connect to a base station via wireless signals. A wireless communication device may connect to a provider network via the wireless access network and may use various applications, such as voice communication, video streaming, sending or receiving data via the Internet, etc. Furthermore, wireless communication devices may be mobile and may move out of communication range of a first base station and into the communication range of a second base station. In response, the wireless access network may handover control and service of the wireless communication device from the first base station to the second base station.

In the course of providing services to wireless communication devices, the operating conditions of the wireless access network may change. As an example, the number of wireless devices attached to a base station may increase and reduce the available capacity of the base station. As another example, a base station may experience fading of wireless signals on particular channels due to changes in the environment. As yet another example, a list of neighboring base stations available for handovers, referred to as a "neighbor list," may change as base stations are added, removed, or changed. In the past, wireless networks had to be optimized manually in response to such changes.

Self-organizing networks (SONs) (sometimes also referred to as "self-optimizing networks") have enabled automation of optimization functions for wireless networks and may be deployed at a scale to manage wireless networks, such as 4G and 5G wireless networks. SON functions may be used to enable discovery and optimization of base station neighbor lists, modification of antenna tilts or directions to improve coverage or capacity, changes to handoff parameters to reduce handover drops, and/or other types of parameters that previously required laborious procedures to be executed manually.

SON functions may be carried out by obtaining various metrics, also referred to as key performance indicators (KPIs), across a large number of base stations and user equipment (UE) devices and to perform autonomous analysis on the obtained metrics. The result of the analysis may indicate a change in one or more parameters of a base station to optimize (i.e., improve) the functioning of the base station in response to changing conditions.

As the data traffic and number of UE devices using wireless access networks increase, the number of different types of UE devices and the number of different types of data also increase. As an example, an exponential growth in Internet of Things (IoT) applications leads to an increasing number of different types of UE devices employing machine-to-machine (M2M) communication, such as Machine-Type Communication (MTC), a type of M2M communication standard developed by the $3^{rd}$ Generation Partnership Project (3GPP). As another example, new technologies, such as large antenna arrays deployed at base stations, may increase the capabilities of a wireless access network while also making existing SON processes difficult to manage.

As an example, a SON system may be configured to err on the side of caution, by being conservative about parameter adjustments so that the performance of a wireless access network is not degraded by an adjustment. Thus, parameter configurations may be set to prevent excessive antenna tilts and/or load balancing of data traffic. However, such conservative configurations may not be optimal and may underutilize the capacity of a wireless access network. As another example, high frequency bands, such as Advanced Wireless Services (AWS) bands in the 1695 to 2200 MegaHertz (MHz) range, or Personal Communications Services (PCS) bands in the 1850 to 1990 MHz range, may be isolated to urban areas with a high base station density due to the short transmission distances associated with such high frequency bands. However, a SON system may not be able to determine which base stations should be configured to use the high frequency bands.

In order to improve the performance of base stations and wireless access networks, a SON system may need to be able to optimize the base stations with respect to coverage, quality, capacity, and/or accessibility. However, optimizing a wireless access network with respect to coverage, quality, capacity, and/or accessibility may be difficult to accomplish when evaluating a large number of base stations.

Implementations described herein relate to contextual network optimization. The area serviced by a base station may be divided into sectors. As an example, the area serviced by the base station may be divided into three 120° sectors, or a different number of circle sectors defining an area with the base station transmitter located in the middle of the area. A SON system may classify base station sectors into context categories based on one or more contexts and may perform a set of optimizations on particular base station sectors based on the determined context categories. In some implementations, each base station sector may include a wireless transceiver associated with the base station. In other implementations, each base station sector may include multiple wireless transceivers and/or a wireless transceiver may be associated with multiple sectors.

The context categories may include cell density context categories. Cell density refers to the density of base stations in a particular geographic area based on the inter-site distance between particular base stations. The cell density for a particular base station sector may be determined based on the neighbor list for the particular base station sector. For example, the SON system may select a base station sector, determine a number of neighbors associated with the selected base station sector, and determine a cell density classification for the selected base station sector based on the determined number of neighbors.

The neighbor list may be optimized to remove low quality neighbors. for example, the SON system may obtain a neighbor list associated with the selected base station sector, filter the neighbor list by removing any neighbors associated with a distance that is smaller than a first distance threshold or longer than a second distance threshold and by removing any neighbors associated with handover success rate that is less than a handover success rate threshold, and determine the number of neighbors based on the filtered neighbor list.

Additionally or alternatively, cell density may be determined using a geo-grid. A geographic area may be divided into grid elements (e.g., hexagonal grid elements, square grid elements, triangular grid elements, etc.) and the number of base stations in a grid element may be determined to determine the cell density for the grid element. If a base station sector is associated with the grid element, the cell density of the grid element may be used to assign a cell density to the base station sector.

The context categories may include mobility context categories. Mobility refers to how mobile the UE devices associated with a base station sector are and may be based on number of handovers. Thus, the SON system may select a base station sector, determine a number of handovers associated with the selected base station sector and determining a mobility classification for the selected base station sector based on the determined number of handovers.

The context categories may include a subscriber type context category. A subscriber type context category may identify the type of subscribers associated with a base station sector. A subscriber type context category may include, for example, a mixed subscriber type context category, an indoor context category, a drone context category, an IoT context category, and/or another type of subscriber user category.

A mixed subscriber type context category may indicate that no particular type of subscriber is dominant among the UE devices associated with a base station sector. An indoor context category may identify a base station sector as including a particular number of UE devices, and/or a particular fraction of UE devices serviced by the base station sector, that are located indoors (e.g., inside a building or another type of structure). Thus, the SON system may select a base station sector, determine a fraction of UE devices, associated with the selected base station sector, that are located indoors based on pathloss values associated with the UE devices, determine that the fraction of UE devices that are located indoors is greater than an indoor fraction threshold, and classify the selected base station sector in an indoor context category based on determining that the fraction of UE devices that are located indoors is greater than an indoor fraction threshold.

An IoT context category may identify a base station sector as including a particular number of UE devices, and/or a particular fraction of UE devices serviced by the base station sector, that are IoT devices. Thus, the SON system may select a base station sector, determine a fraction of UE devices, associated with the selected base station sector, that are IoT devices (e.g., based on packet size, based on frequency of communication over a time period, based on a device identifier, etc.), determine that the fraction of UE devices that are IoT devices is greater than an IoT device fraction threshold, and classify the selected base station sector in an IoT device context category based on determining that the fraction of UE devices that are IoT devices is greater than the IoT device fraction threshold.

A drone context category may identify a base station sector as including a particular number of UE devices, and/or a particular fraction of UE devices serviced by the base station sector, that are drones/unmanned aerial vehicles (UAVs). Thus, the SON system may select a base station sector, determine a fraction of UE devices, associated with the selected base station sector, that are drone devices (e.g., based on movement speed, based on elevation or changes in elevation, etc.), determine that the fraction of UE devices that are drone devices is greater than an drone device fraction threshold, and classify the selected base station sector in a drone device context category based on determining that the fraction of UE devices that are drone devices is greater than the drone device fraction threshold.

The contextual optimizations performed by the SON system may be prioritized. The SON system may first perform an optimization for a context category with respect to quality and coverage. Quality refers to the quality of signals sent and received by a UE device connected to a base station and coverage refers to the distance from the base station at which a UE device is still able to send and receive signals between the UE device and the base station while still satisfying one or more KPIs. Quality may be optimized by maximizing the signal quality and coverage may be optimized by maximizing the coverage. There may be a tradeoff between quality and coverage and different context categories may be given different weights with respect to quality and coverage. For example, a first context category may be optimized to increase quality and a second context category may be optimized to increase coverage.

After quality and coverage optimization, the SON system may perform an optimization for the context category with respect to capacity. Capacity refers to the capacity of one or more wireless access networks to handle UE devices. Capacity may be optimized by load balancing UE devices across base stations in order to not overload a particular base station or under-utilize another base station. After capacity optimization, the SON system may perform an optimization for the context category with respect to accessibility. Accessibility refers to the ability of UE devices to discover and access the wireless access network via a base station. Accessibility may be optimized by maximizing the number of UE devices that are able to access the wireless access network and/or maximizing the distance from a base station at which UE devices are able to access the wireless access network.

Thus, the SON system may classify base station sectors into context categories based on a context that includes at least a measure of cell density and a measure of mobility, select a context category, determine at least one coverage and quality optimization parameter adjustment for a subset of the base station sectors that are classified in the selected context category, based on a coverage and quality requirement associated with the selected context category, determine at least one capacity optimization parameter adjustment for the subset of base station sectors based on a capacity requirement associated with the selected context category, and determine at least one accessibility optimization parameter adjustment for the subset of base station sectors based on an accessibility requirement associated with the selected context category. The SON system may then instruct base stations associated with the subset of base station sectors to implement the at least one coverage and quality optimization parameter adjustment, the at least one capacity optimization parameter adjustment, and the at least one accessibility optimization parameter adjustment.

Determining the at least one coverage and quality optimization parameter adjustment may include selecting the at least one coverage and quality optimization parameter adjustment to improve signal quality, when the selected context category corresponds to a high density context category and selecting the at least one coverage and quality optimization parameter adjustment to improve signal coverage, when the selected context category corresponds to a low density context category, associated with a lower base station density than the high density context category.

Determining the at least one coverage and quality optimization parameter adjustment may include selecting the at least one coverage and quality optimization parameter adjustment to improve signal coverage, when the selected context category corresponds to a high mobility context category and selecting the at least one coverage and quality optimization parameter adjustment to improve signal quality, when the selected context category corresponds to a low mobility context category, associated with a lower handover rate than the high mobility context category. Furthermore, determining the at least one coverage and quality optimization parameter adjustment may include selecting a down tilt adjustment for an antenna to improve quality or selecting an up tilt adjustment for the antenna to improve coverage.

Determining the at least one capacity optimization parameter adjustment may include at least one of selecting an intra-frequency cell offset based on the selected context category, selecting an inter-frequency cell offset based on the selected context category, and/or selecting a carrier aggregation configuration based on the selected context category. Moreover, determining the at least one capacity optimization parameter adjustment may include selecting a high cell offset, when the selected context category corresponds to a high density context category and selecting a low cell offset, lower than the high cell offset, when the selected context category corresponds to a low density context category, associated with a lower base station density than the high density context category.

Furthermore, determining the at least one capacity optimization parameter adjustment may include selecting a low handover threshold for handovers from a high frequency band to a low frequency band, associated with lower frequencies than the high frequency band, when the selected context category corresponds to a high density context category and selecting a high handover threshold for handovers from the high frequency band to the low frequency band, when the selected context category corresponds to a low density context category, associated with a lower base station density than the high density context category.

Determining the at least one accessibility optimization parameter adjustment may include at least one of selecting a physical random access channel (PRACH) preamble based on the selected context category, selecting a root sequence index (RSI) based on the selected context category, or selecting a cell radius based on the selected context category. Furthermore, determining the at least one accessibility optimization parameter adjustment may include selecting a short time PRACH preamble, when the selected context category corresponds to a high density context category and selecting a long time PRACH preamble, which takes a longer time to transmit than the short time PRACH preamble, when the selected context category corresponds to a low density context category, associated with a lower base station density than the high density context category.

Furthermore, other contextual optimizations may be performed. For example, the SON system may perform mobility optimization by selecting a mobility context category, determining at least one handover parameter adjustment for a subset of base station sectors associated with the selected mobility context category, and instructing base stations associated with the subset of base station sectors to implement the at least one handover parameter adjustment.

Implementations described herein further relate to a SON system configured to perform self-healing. A SON system may perform the functions of self-configuration, self-optimization, and self-healing. Self-configuration may include auto-configuration of base station sector profiles. With respect to contextual network optimization, self-configuration may include neighbor list optimization, optimization of inter-cell distance between base stations, and categorization of base station sectors into context categories. Self-optimization may include coverage and quality optimization, capacity optimization, accessibility optimization, and/or mobility optimization.

Self-healing may include classifying a base station sector into a problem scenario context category and performing reactive optimization based on the problem scenario context category. The reactive optimization may include, for example, applying a particular problem scenario algorithm to a base station sector classified in a particular problem scenario context category. The problem scenario context category may include, for example, a low efficiency problem context category, a service level problem context category, a device level problem context category, a cell outage problem context category, an energy consumption problem context category, a congestion problem context category, and/or another type of problem context category. After a base station sector is classified in a particular problem context category, a SON problem category process may be applied to the base station sector to address the problem associated with the particular problem context category. If the SON problem category process does not resolve the problem, the base station sector may be flagged for manual optimization.

In some implementations, a SON system may perform a tiered contextual optimization. Different context categories may be associated with different tiers and the SON system may perform a sequential hierarchical optimization based on the tiers. For example, a first tier may correspond to a classification based on cell density, a second tier may correspond to a classification based on subscriber type context categories, and a third tier may correspond to a classification based on problem context categories. The SON system may perform a first tier optimization based on cell density context categories and determine whether optimization convergence occurs as a result of the optimization based on cell density context categories.

KPIs used by the SON system to make a decision may be referred to as first degree KPIs. KPIs used in a feedback phase to evaluate the performance of a SON adjustment may be referred to as second degree KPIs. The second degree KPIs may be evaluated to ensure that the SON adjustment did not cause an unexpected change and/or decrease in performance. In some implementations, optimization convergence may be measured by tracking one or more first degree KPIs over a time period and/or over a particular number of optimization cycles to determine whether the one or more KPIs are improving by at least a particular rate. In other implementations, optimization convergence may be measured by a KPI cost function to determine whether the KPI cost function reaches a particular threshold.

If the first tier optimization does not reach optimization convergence, the SON system may perform a second tier optimization based on subscriber type context categories. If the second tier optimization does not reach optimization convergence, the SON system may perform a third tier optimization based on problem context categories. If the third tier optimization does not reach convergence, the SON system may trigger an alert to perform manual optimization.

FIG. 1 is a diagram of an exemplary environment 100 in which systems and/or methods, described herein, may be implemented. As shown in FIG. 1, environment 100 may include UE devices 110-A to 110-M, an access network 120, and provider network 140. Access network 120 may include base stations 130-A to 130-N and a particular UE device 110 may connect to access network 120 via a particular base station 130 using wireless signals. While a single access network 120 is shown in FIG. 1 for illustrative purposes, in practice, environment 100 may include multiple access networks 120.

In some implementations, UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.), a global positioning system (GPS) device; a laptop computer, a tablet computer, or another type of portable computer; a media playing device; a portable gaming system; a home appliance device; a home monitoring device; and/or any other type of computer device with wireless communication capabilities.

In other implementations, UE device 110 may include an IoT computer device enabled with wireless communication functionality and employing machine-to-machine (M2M) communication, such as, for example, Machine-Type Communication (MTC), a type of M2M communication standard developed by the $3^{rd}$ Generation Partnership Project (3GPP). Examples of such M2M devices may include a health monitoring device (e.g., a blood pressure monitoring device, a blood glucose monitoring device, etc.), an asset tracking device (e.g., a system monitoring the geographic location of a fleet of vehicles, etc.), a device controlling one or more functions of a vehicle (e.g., a climate control system, an engine monitoring system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, etc.), a device controlling a financial transaction system (e.g., a point-of-sale terminal, a vending machine, etc.), an unmanned aerial drone vehicle or aircraft system, and/or another type of electronic device.

Access network 120 may provide access to services available via provider network 140 for UE devices 110, including mobile telephone service, video content delivery, Internet access, and/or other types of data services. For example, access network 120 may establish a packet data network connection (e.g., an Internet Protocol (IP) connection) between UE device 110 and provider network 140. In some implementations, access network 120 may include a Long Term Evolution (LTE) access network (e.g., an evolved packet core (EPC) network) based on the LTE standard specified by the $3^{rd}$ Generation Partnership Project (3GPP). In other implementations, access network 120 may include an LTE Advanced (LTE-A) access network and/or a 5G access network that includes functionality such as carrier aggregation; advanced or massive multiple-input and multiple-output (MIMO) configurations (e.g., an 8×8 antenna configuration, a 16×16 antenna configuration, a 256×256 antenna configuration, etc.); cooperative MIMO (CoMP); relay stations; Heterogeneous Networks (HetNets) of overlapping small cells and macrocells; Self-Organizing Network (SON) functionality; MTC functionality, such as 1.4 MHz wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality. In yet other implementations, access network 120 may include a Code Division Multiple Access (CDMA) access network based on, for example, a CDMA1000 standard. For example, the CDMA access network may include a CDMA enhanced High Rate Packet Data (eHRPD) network (which may provide access to an LTE access network).

As stated above, access network 120 may include a base station 130 and UE device 110 may wirelessly communicate with access network 120 via base station 130. In other words, UE device 110 may be located within the geographic area serviced by base station 130. Base station 130 may be part of an LTE eNodeB base station device and/or another LTE-A or 5G base station device (e.g., a gNodeB). An eNodeB base station device may use the Evolved Universal Terrestrial Radio Access (E-UTRA) air interface or other air interfaces to wirelessly communicate with devices. An eNodeB base station device may include one or more devices (e.g., base stations 130) and other components and functionality that allow UE device 110 to wirelessly connect to access network 120. The eNodeB base station device may include or be associated with one or more cells. For example, each cell may include an RF transceiver facing a particular direction. The eNodeB base station device may correspond to a macrocell or to a small cell (e.g., a femtocell, a picocell, a microcell, etc.).

Provider network 140 may be managed, at least in part, by a provider of communication services associated with access network 120. Provider network 140 may include a local area network (LAN), a wide area network (WAN), a metropolitan area network (MAN), an optical network, a cable television network, a satellite network, a wireless network (e.g., a Code Division Multiple Access (CDMA) network, a general packet radio service (GPRS) network, and/or an LTE network), an ad hoc network, a telephone network (e.g., the Public Switched Telephone Network (PSTN) or a cellular network), an intranet, or a combination of networks. Provider network 140 may allow the delivery of Internet Protocol (IP) services to UE device 110, and may interface with other external networks. In some implementations, provider network 140 may include an Internet Protocol Multimedia Subsystem (IMS) network (not shown in FIG. 1). An IMS network may include a network for delivering IP multimedia services as specified by 3GPP or other standards/protocols and may provide media flows between UE device 110 and external IP networks or external circuit-switched networks (not shown in FIG. 1). Provider network 140 may include one or more server devices and/or network devices, or other types of computation or communication devices to manage the functionality of provider network 140. For example, provider network 140 may include a SON system 150 and an Operations Support System (OSS) 160.

SON system 150 may include one or more devices, such as computer devices and/or server devices, which perform self-organization functions for access network 120 and/or provider network 140. SON system 150 may communicate with OSS 160 to obtain information relating to UE devices 110 and/or base stations 130. SON system 150 may classify sectors of base stations 130 into context categories based on a context that includes one or more of the density of base stations associated with a sector, the mobility of UE devices 110 associated with the sector, whether UE devices 110 associated with the sector are indoors, whether UE devices 110 associated with the sector include unmanned aerial vehicles or drones, and/or another context. SON system 150 may select adjustments to one or more optimization parameters for a sector based on a context category associated with the sector. SON system 150 may first optimize the sector with respect to quality and coverage, then may optimize the sector with respect to capacity, and then may optimize the sector with respect to accessibility. SON system 150 may further optimize the sector with respect to mobility. SON system 150 may send instructions, via OSS 160, to base station 130 associated with the sector to adjust the one or more optimization parameters based on the selected adjustments.

OSS 160 may include one or more devices, such as computer devices and/or server devices, which perform operations support functions for provider network 140. Operations support functions may include provisioning of services, service delivery and fulfillment, network configuration and management, fault management, and/or other type of functionalities. OSS 160 may collect KPI values, and/or other types of information, associated with UE devices 110 and/or base stations 130. For example, OSS 160 may receive, at particular intervals, information associated with base station 130 and/or UE devices 110 attached to base station 130. OSS 160 may provide the obtained information to SON system 150. Furthermore, OSS 160 may receive an instruction from SON system 150 to adjust a particular parameter for base station 130 and may instruct base station 130 to adjust the particular parameter in response to the received instruction. Thus, OSS 160 may include a base station manager and a base station database (DB) that stores information identifying particular base stations 130, information indicating how to reach the particular base stations 130, and/or information relating to previous and/or current optimization settings associated with the particular base stations 130.

Although FIG. 1 shows exemplary components of environment 100, in other implementations, environment 100 may include fewer components, different components, differently arranged components, or additional functional components than depicted in FIG. 1. Additionally or alternatively, one or more components of environment 100 may perform functions described as being performed by one or more other components of environment 100. For example, in some implementations, some or all of the functionality of OSS 160 may be implemented in SON system 150. Additionally or alternatively, some or all of the functionality of SON system 150 may be implemented by base station 130 or by a group of base stations 130.

Figure 2:
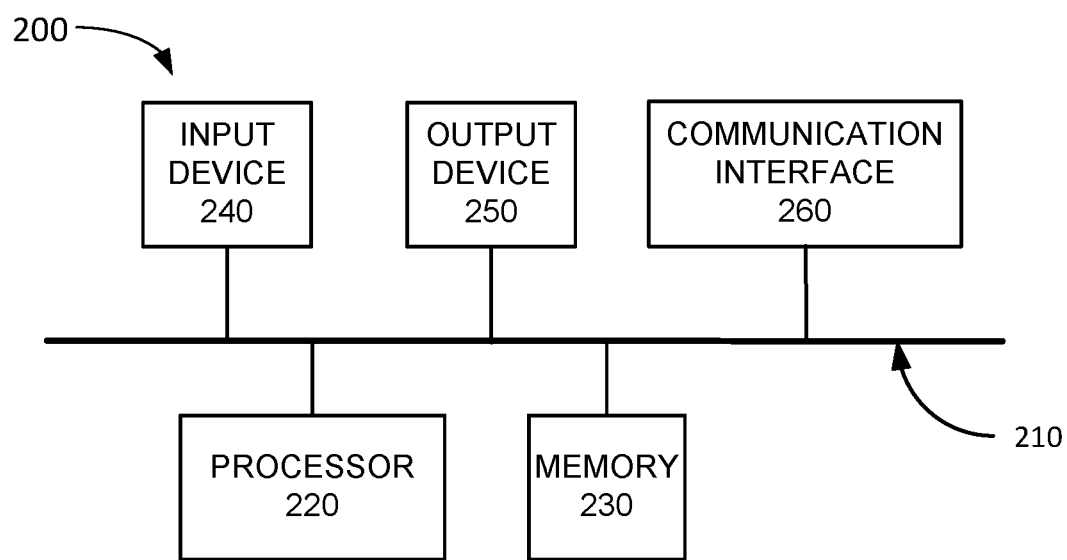
FIG. 2 is a diagram illustrating exemplary components of a device that may be included in a device or system of FIG. 1.

FIG. 2 is a diagram illustrating exemplary components of device 200 according to an implementation described herein. SON system 150, OSS 160, base station 130, and/or UE device 110 may each include one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, and/or processing logic (or families of processors, microprocessors, and/or processing logics) that interprets and executes instructions. For example, processor 220 may include one or more Central Processing Units (CPUs) and/or one or more Graphics Processing Units (GPU). In other embodiments, processor 220 may include an application-specific integrated circuit (ASIC), a field-programmable gate array (FPGA), and/or another type of integrated circuit or processing logic. Processor 220 may control operation of device 200 and its components.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200 and/or to collect information from the environment using one or more sensors. Input device 240 may include, for example, buttons (e.g., a keyboard, keys of a keypad, control buttons, etc.), a mouse, a pen, a joystick, a tracking pad, a stylus, a remote control, a microphone or another audio capture device, an image and/or video capture device (e.g., a camera), a touch-screen display, a light sensor, a gyroscope, an accelerometer, a proximity sensor, a temperature sensor, a barometer, a compass, a health sensor (e.g., pulse rate monitor, etc.), and/or another type of input device. In some implementations, device 200 may be managed remotely and may not include input device 240. In other words, device 200 may be "headless" and may not include a keyboard, for example.

Output device 250 may output information to an operator of device 200 and/or to control device 200 and/or the environment using one or more actuators. Output device 250 may include a display, a printer, a speaker, an illumination source (e.g., a camera flash), an actuator to cause device 200 to vibrate, a motor to cause part of device 200 to move, a lock device, and/or another type of output device. For example, device 200 may include a display, which may include a liquid-crystal display (LCD), a light emitting diode (LED) display, an organic LED (OLED) display, an electrophoretic (e.g., electronic ink) display, and/or another type of display device for displaying content to a user. In some implementations, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., radio frequency (RF), infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to RF signals and/or a receiver that converts RF signals to baseband signals. Communication interface 260 may be coupled to an antenna for transmitting and receiving RF signals. For example, if device 200 is included in UE device 110 and/or base station 130, communication interface 260 may include an antenna assembly that includes one or more antennas to transmit and/or receive RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface or an interface for another type of short range (e.g., less than 100 meters) wireless communication method, a radio-frequency identification (RFID) interface, a near-field communications (NFC) wireless interface, a Global Positioning System (GPS) receiver to obtain location information from GPS satellites, an optical transceiver, and/or any other type of interface that converts data from one form to another form.

As will be described in detail below, device 200 may perform certain operations relating to determining contextual SON adjustments. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2. Additionally or alternatively, one or more components of device 200 may perform one or more tasks described as being performed by one or more other components of device 200.

Figure 3:
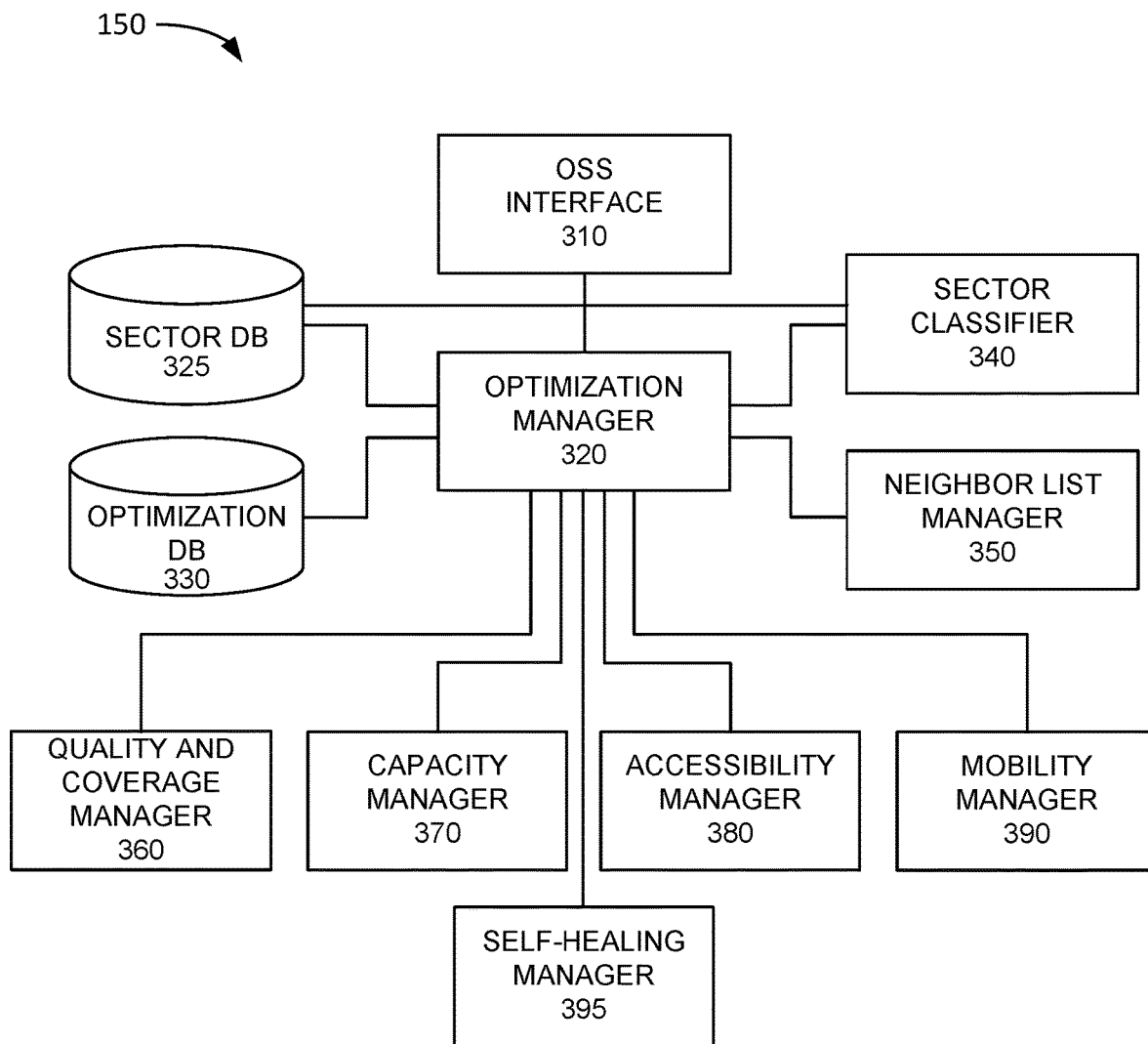
FIG. 3 is a diagram illustrating exemplary functional components of the self-organizing network system of FIG. 1.

FIG. 3 is a diagram illustrating exemplary functional components of SON system 150. The functional components of SON system 150 may be implemented, for example, via processor 220 executing instructions from memory 230. Alternatively, some or all of the functional components included in SON system 150 may be implemented via hard-wired circuitry. As shown in FIG. 3, SON system 150 may include an OSS interface 310, an optimization manager 320, a sector database (DB) 325, an optimization DB 330, a sector classifier 340, a neighbor list manager 350, a quality and coverage manager 360, a capacity manager 370, an accessibility manager 380, a mobility manager 390, and a self-healing manager 395.

OSS interface 310 may be configured to communicate with OSS 160. For example, OSS 160 may obtain information relating to UE devices 110 from base stations 130, from other devices in access network 120 (e.g., from a Home Subscriber Server), from a DB maintained by OSS 160, and/or from other sources and may provide the obtained information to OSS interface 310. Furthermore, OSS interface 310 may send instructions from optimization manager 320 to OSS 160, such as instructions to adjust a particular optimization parameter for a particular base station 130. Moreover, OSS interface 310 may report information from OSS 160 relating to the performance of access network 120 and/or provider network 140 to other components in SON system 150.

Optimization manager 320 may perform contextualized optimizations for base station sectors of base stations 130. Optimization manager 320 may select a context category from sector DB 325 and may determine an adjustment to an optimization parameter for base station sectors classified in the selected context category, using information stored in optimization DB 330. Exemplary information that may be stored in sector DB 325 is described below with reference to FIG. 4A and exemplary information that may be stored in optimization DB 330 is described below with reference to FIG. 4B. Optimization manager 320 may perform the contextualized optimizations using quality and coverage manager 360, capacity manager 370, accessibility manager 380, and/or mobility manager 390.

In some implementations, optimization manager 320 may perform tiered contextual optimization. Optimization manager 320 may perform a first tier contextual optimization based on cell density and determine whether optimization convergence occurs as a result of the optimization based on cell density context categories. If the first tier optimization does not reach optimization convergence, optimization manager 320 may perform a second tier optimization based on subscriber type context categories. If the second tier optimization does not reach optimization convergence, optimization manager 320 may perform a third tier optimization based on problem context categories. If the third tier optimization does not reach convergence, optimization manager 320 may trigger an alert to perform manual optimization.

Sector classifier 340 may classify base station sectors into context categories and may store information relating to the classification in sector DB 325. For example, sector classifier 340 may classify a base station sector into a particular cell density context category based on the number of neighbors and/or a geographic grid cell density associated with the base station sector; classify the base station sector into a particular mobility context category based on the number of successful handovers associated with the base station sector; and/or classify the base station sector into a subscriber type context category, such as a mixed subscriber type context category, an indoor context category, an IoT context category, a drone context category, and/or another type of subscriber type context category.

In some implementations, sector classifier 340 may classify sectors into context categories using one or more machine learning (ML) classifiers, such as a neural network classifier, a naive Bayesian classifier, a kernel density estimation classifier, a decision tree classifier, a support vector machine classifier, a maximum entropy classifier, and/or another type of classifier.

Neighbor list manager 350 may optimize a neighbor list associated with a base station sector. For example, neighbor list manager 350 may obtain a neighbor list for a base station sector and remove low quality neighbors from the list by filtering the list to remove neighbors that are further than a distance threshold and/or remove neighbors that are associated with a low handover success rate (e.g., a handover success rate lower than a handover success rate threshold). Furthermore, neighbor list manager 350 may filter the list to remove neighbors that are too close (e.g., closer than a proximity threshold) and/or to remove any non-macro neighbors, such as small cell base stations. The filtered neighbor list may be used by sector classifier 340 to determine a cell density classification for the base station sector.

Quality and coverage manager 360 may determine an adjustment to a quality and coverage parameter based on a context category associated with a base station sector. For example, quality and coverage manager 360 may determine an adjustment to an antenna parameter, an adjustment to a power parameter, and/or an adjustment to a different type of a quality/coverage parameter. Quality and coverage manager 360 may select whether to optimize quality or coverage for a particular cell density context category. Base station sectors in a high density context category may be optimized for quality by, for example, down tilting one or more antennas and/or reducing one or more power settings. Base station sectors in a low density context category may be optimized for coverage, by, for example, up tilting one or more antennas and/or increasing one or more power settings. Quality and coverage manager 360 may also select to improve signal coverage, when the selected context category corresponds to a high mobility context category and select to improve signal quality, when the selected context category corresponds to a low mobility context category.

Capacity manager 370 may determine an adjustment to a capacity parameter based on a context category associated with a base station sector. For example, capacity manager 370 may determine an adjustment to a cell offset parameter. A cell offset parameter may broadcast in a System Information Block (SIB) to UE devices 110 by base station 130 and may instruct UE device 110 to offset the strength of signals received from base station 130 by the specified offset amount. For example, an offset of −10 decibel (dB) may instruct UE device 110 to perceive the received signals as being 10 dB weaker. The offset may thus be used to cause UE device 110 to prefer another base station 130 and/or may cause UE device 110 to request a handover to another base station 130. Thus, cell offsets may be used to load balance UE devices 110 across multiple base stations 130.

The cell offset parameter may correspond to an intra-frequency offset parameter (e.g., used for handovers using the same band) and/or an inter-frequency offset parameter (e.g., used for handovers between different frequency bands). Capacity manager 370 may select a high cell offset for a high density context category and a low cell offset for a low density context category, because handovers for load balancing may be more desirable in high cell density areas and less desirable in low cell density areas. Furthermore, capacity manager 370 may select a low handover threshold for handovers from a high frequency band to a low frequency band for a high density context category and a high handover threshold for handovers from a high frequency band to a low frequency band for a low density context category, because in a high cell density environment there may be a coverage safety net and base station 130 may be more aggressive in pushing UE devices 110 to lower frequency bands to increase capacity.

As another example, capacity manager 370 may determine an adjustment to a carrier aggregation parameter. A carrier aggregation parameter may determine how many different channels and/or bands are used by a base station sector for carrier aggregation. For example, capacity manager 370 may select more carriers in a dense environment, because in a high cell density environment there may be a coverage safety net and base station 130 may be more aggressive in using a larger number of carriers at different frequencies.

Accessibility manager 380 may determine an adjustment to an accessibility parameter based on a context category associated with a base station sector. Accessibility manager 380 may select a PRACH preamble based on a context category, select an RSI based on a context category, and/or select a cell radius based on a context category. Different PRACH preambles take different lengths of time to transmit and may determine how far away UE device 110 may be located from base station 130 without overlapping the attempt of another UE device 110 to access base station 130. Furthermore, the RSI may determine which sequence is transmitted in a PRACH preamble and may determine an effective cell radius for a base station sector. Thus, for example, accessibility manager 380 may select a short time PRACH preamble for base station sectors classified in a high density context category and select a long time PRACH preamble for base station sectors classified in a low density context category.

Mobility manager 390 may determine an adjustment to mobility parameter based on a context category associated with a base station sector. For example, mobility manager 390 may adjust one or more handover parameters for base station sectors classified in a particular context category, such as an event handover parameter, a handover offset parameter, a handover hysteresis parameter, a handover time to trigger parameter, and/or another type of handover parameter.

Self-healing manager 390 may classify base station sectors into problem context categories and perform reactive optimization based on the problem scenario context categories, such as, for example, a low efficiency problem context category, a service level problem context category, a device level problem context category, a cell outage problem context category, an energy consumption problem context category, a congestion problem context category, and/or another type of problem context category. Self-healing manager 390 may apply a particular problem scenario process to a base station sector based on the base station sector being classified in a particular problem context category.

The reactive optimization may include, for example, applying a particular problem scenario algorithm to a base station sector classified in a particular problem scenario context category. The problem scenario context category may include, for example, a low efficiency problem context category, a service level problem context category, a device level problem context category, a cell outage problem context category, an energy consumption problem context category, a congestion problem context category, and/or another type of problem context category.

A low efficiency problem context category may be identified based on detecting that a measure of spectral efficiency for a base station sector is below an efficiency threshold. A service level problem category context category may be identified based on detecting that a particular KPI for a particular service (e.g., real-time voice, real-time video, video streaming, ultra-reliable low latency communication (URLLC), mobile broadband, etc.), is below a KPI threshold. A device level problem context category may be identified based on detecting that a particular KPI, associated with particular UE devices 110, is below a device KPI threshold. A cell outage problem context category may be identified based on detecting that a base station sector has experienced outages at a rate that is higher than an outage rate threshold. An energy consumption problem context category may be identified based on detecting that the energy consumption of a base station sector is higher than an energy consumption threshold. A congestion problem context category may be identified based on detecting that a base station sector is associated with a congested state at a rate that is higher than a congestion rate threshold.

After a base station sector is classified in a particular problem context category, a SON problem category process may be applied to the base station sector to address the problem associated with the particular problem context category. If the SON problem category process does not resolve the problem, the base station sector may be flagged for manual optimization.

Although FIG. 3 shows exemplary components of SON system 150, in other implementations, SON system 150 may include fewer components, different components, additional components, or differently arranged components than depicted in FIG. 3. Additionally or alternatively, one or more components of SON system 150 may perform one or more tasks described as being performed by one or more other components of SON system 150. Furthermore, in some implementations, some or all of the functional components of SON system 150 shown in FIG. 3 may be implemented in one or more devices of environment 100, such as, for example, base station 130.

Figure 4A:
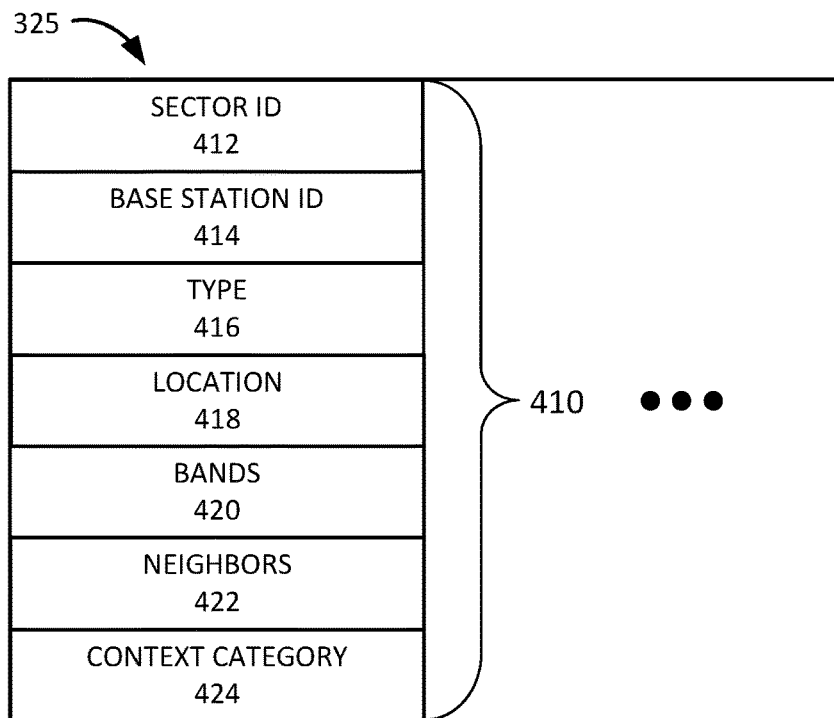
FIG. 4A is a diagram illustrating exemplary components of the sector database (DB) of FIG. 3.

FIG. 4A is a diagram illustrating exemplary components of sector DB 325. As shown in FIG. 4A, sector DB 325 may include one or more sector records 410. Each sector record 410 may store information relating to a particular sector. Sector record 410 may include a sector identifier (ID) field 412, a base station ID field 414, a type field 416, a location field 418, a bands field 420, a neighbors field 422, and a context category field 424.

Sector ID field 412 may include an ID that uniquely identifies a particular base station sector. Base station ID field 414 may include information identifying base station 130 associated with the particular base station sector. Type field 416 may identify a type of cell associated with the particular base station sector, such as whether the particular base station sector corresponds to a macro cell or a small cell. Location field 418 may store information identifying the location of the particular base station sector.

Bands field 420 may identify one or more bands available via the particular base station sector. For example, bands field 420 may indicate that the particular base station sector is enabled to send and receive messages using an identified band, such as a 700 MHz band, an 850 MHz band, an AWS band, a PCS band, and/or another LTE band.

Neighbors field 422 may list the neighboring base stations 130 included in the neighbor list of the particular base station sector. Furthermore, each neighbor listing may include information relating to the neighbor, such a type of cell for the neighbor, the distance to the neighbor, a number of handover attempts to and/or from the neighbor within a particular time period, a number of successful handovers to and/or from the neighbor within the particular time period, and/or other types of information relating to the neighbor.

Context category field 424 may include information identifying one or more context categories into which the particular base station sector was classified. Context category field 424 may identify a cell density category, such as very high cell density category, a high density category, a medium density category, or a low density category. In some implementations, cell density categories may be based on a distribution of cell densities for all base stations 130 in a particular access network 120, geographic area, and/or another type of grouping. For example, the cell density categories may be based on quartiles. Thus, a first fourth of base station sectors associated with the highest cell densities may be categorized in the very high density category, a second fourth of base station sectors associated with the second highest cell densities may be categorized in the high density category, a third fourth of base station sectors associated with the third highest cell densities may be categorized in the medium density category, and a last fourth of base station sectors with the lowest cell densities may be categorized in the low density category. In other implementations, the cell density categories may be based on a different criterion, such as particular cell density values.

Furthermore, context category field 424 may identify a mobility category, such as a very high mobility category, a high mobility category, a medium mobility category, or a low mobility category, similarly to as described above with respect to cell density. Other types of mobility categories may include an inter-frequency band mobility category that indicates a particular mobility rate between different frequency bands.

Moreover, context category field 424 may identify a subscriber type context category, such as, for example, a mixed subscriber type context category, an indoor context category, a drone context category, an IoT context category, and/or another type of subscriber user category. The particular base station sector may be classified as being in an indoor category if at least a fraction or percentage of UE devices 110 associated with the particular base station sector are identified as being located indoors for at least a particular percentage of time. UE device 110 may be identified as being indoors by comparing observed pathloss values with expected pathloss values for a particular band used by UE device 110 to communicate with base station 130. For example, if the observed pathloss values are greater than the expected pathloss values by at least a pathloss threshold amount, UE device 110 may be identified as being indoors.

The particular base station sector may be classified in drone category if at least a fraction or percentage of UE devices 110 associated with the particular base station sector are identified as corresponding to unmanned aerial vehicles. Unmanned aerial vehicles may be identified based on speed of movement and/or elevation information. Base station sectors classified in a drone category may be excluded from particular optimization adjustments. For example, base station sectors classified in a drone category may be excluded from antenna tilt adjustments.

The particular base station may be classified in an IoT category if at least a fraction or percentage of UE devices 110 associated with the particular base station sector are identified as corresponding to IoT devices. UE device 110 may be identified as an IoT device is the packet size associated with the UE device 110 is below a particular packet size threshold.

Furthermore, context category field 424 may also identify a problem context category, such as, for example, a low efficiency problem context category, a service level problem context category, a device level problem context category, a cell outage problem context category, an energy consumption problem context category, a congestion problem context category, and/or another type of problem context category.

Although FIG. 4A shows exemplary components of sector DB 325, in other implementations, sector DB 325 may include fewer components, different components, additional components, or differently arranged components than depicted in FIG. 4A.

Figure 4B:
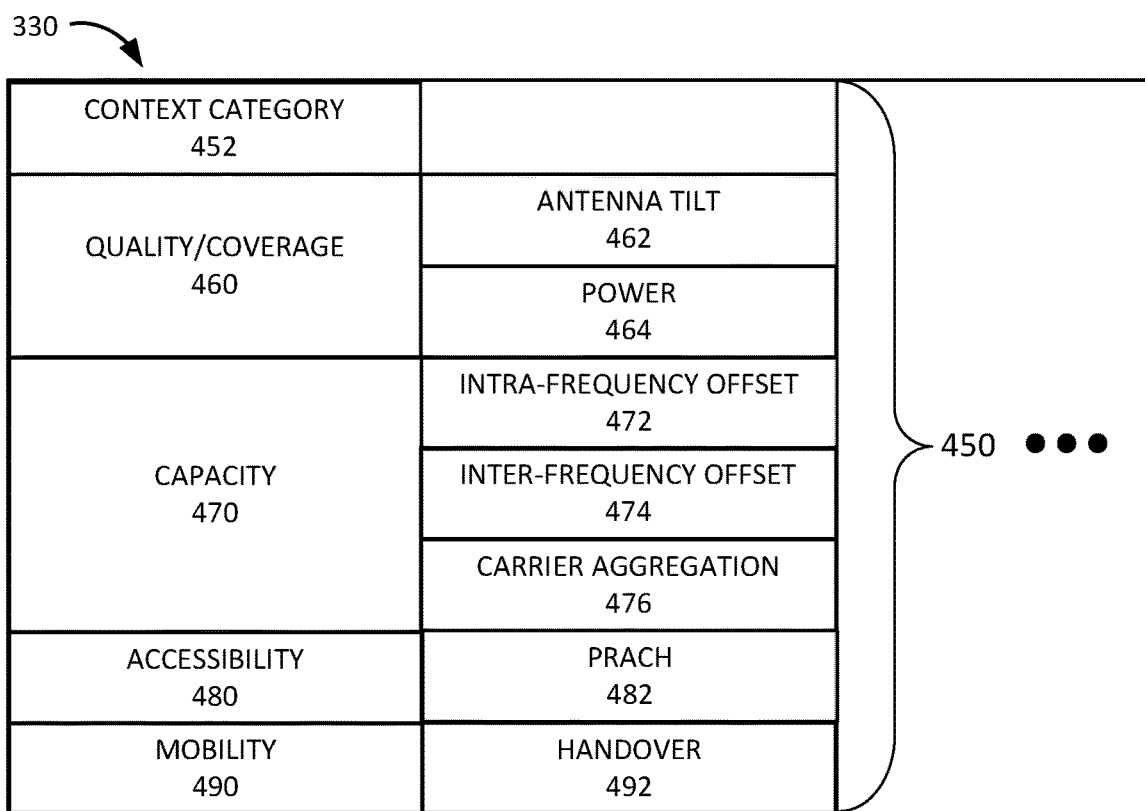
FIG. 4B is a diagram illustrating exemplary components of the optimization DB of FIG. 3.

FIG. 4B is a diagram illustrating exemplary components of optimization DB 330. As shown in FIG. 4B, optimization DB 330 may include one or more context category records 450. Each context category record 450 may store information relating to a particular context category. Context category record 450 may include a context category ID field 452, a quality/coverage field 460, a capacity field 470, an accessibility field 480, and a mobility field 490.

Context category ID field 452 may include information identifying a particular context category, such as, as an example, a combination of a cell density context category and a mobility context category as described above with reference to context category field 424 of FIG. 4A. Moreover, context category ID field 452 may identify a subscriber type context category, such as an indoor context category, an IoT context category, and/or drone context category as described above with reference to context category field 424 of FIG. 4A. Furthermore, context category ID field 452 may identify a problem context category as described above with reference to context category field 424 of FIG. 4A.

Quality/coverage field 460 may store information identifying quality and coverage optimization parameter adjustments associated with the particular context category. Quality/coverage field 460 may include quality and coverage weights that indicate how much weight should be given to quality and how much weight should be given to coverage. Furthermore, quality/coverage field 460 may identify one or more antenna tilt settings (e.g., mechanical tilt, remote electric tilt, auxiliary tilt, etc.), other types of antenna settings (e.g., antenna azimuth, antenna beam width, etc.), one or more transmission power settings, and/or other types of parameter adjustment used to improve quality or coverage.

Capacity field 470 may store information identifying capacity optimization parameter adjustments associated with the particular context category. For example, capacity field 470 may store information identifying one or more intra-frequency cell offsets, one or more inter-frequency cell offset, a particular carrier aggregation configuration (e.g., a number of secondary carriers in carrier aggregation, etc.), and/or another type of parameter adjustment used to improve capacity.

Accessibility field 480 may store information identifying accessibility optimization adjustments associated with the particular context category. For example, accessibility field 480 may store information identifying a particular PRACH preamble, a particular RSI, and/or a particular cell radius. Furthermore, accessibility field 480 may store additional PRACH parameters, such as an initial transmission power for a PRACH, a change in transmit power on subsequent attempts for the PRACH, the number of attempts allowed on the PRACH, and/or other types of PRACH parameters.

Mobility field 490 may store information identifying mobility optimization adjustments associated with the particular context category. For example, mobility field 490 may store one or more handover parameter adjustments and/or settings, such as adjustments/settings for a handover threshold parameter, a handover offset parameter, a handover hysteresis parameter, a handover time to trigger parameter, and/or another type of handover parameter.

Although FIG. 4B shows exemplary components of optimization DB 330, in other implementations, optimization DB 330 may include fewer components, different components, additional components, or differently arranged components than depicted in FIG. 4B. For example, optimization DB 330 may store information relating to adjustments/settings for additional optimization parameters for a particular context category, such as, for example, adjustments/settings for a retransmission parameter (e.g., a Hybrid Automatic Repeat Request (HARD) number, etc.), a delay optimization setting (e.g., a discontinuous reception (DRX) mode inactivity timer, DRX cycle timer, DRX retransmission timer, etc.), and/or any other type of parameter that may be adjusted by SON system 150 based on a context category.

Figure 5:
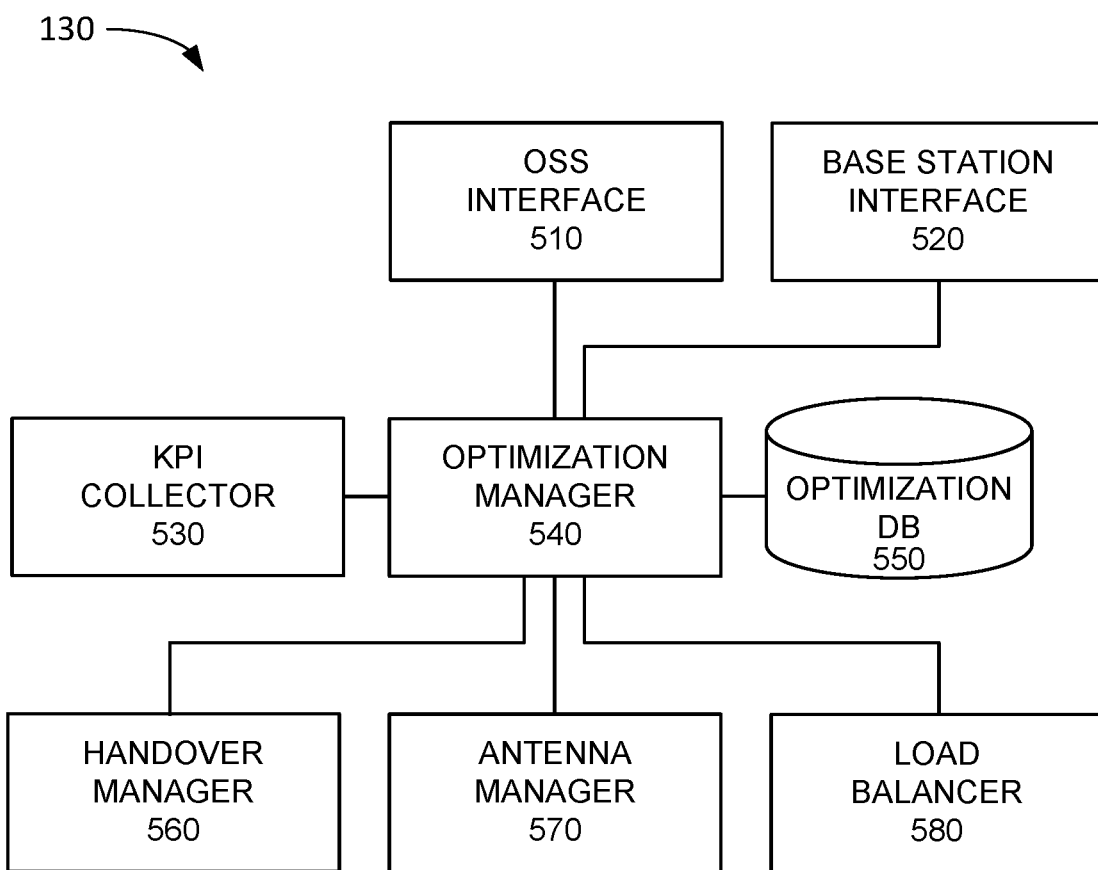
FIG. 5 is a diagram illustrating exemplary functional components of a base station of FIG. 1.

FIG. 5 is a diagram illustrating exemplary functional components of base station 130. The functional components of base station 130 may be implemented, for example, via processor 220 executing instructions from memory 230. Alternatively, some or all of the functional components included in base station 130 may be implemented via hard-wired circuitry. As shown in FIG. 5, base station 130 may include an OSS interface 510, a base station interface 520, a KPI collector 530, an optimization manager 540, an optimization DB 550, a handover manager 560, an antenna manager 570, and a load balancer 580.

OSS interface 510 may be configured to communicate with OSS 160. For example, OSS interface 510 may provide information relating to UE devices 110 associated with base station 130 to OSS 160 and OSS 160 may relay the information to SON system 150. Furthermore, OSS interface 510 may receive an instruction to adjust a particular optimization parameter from SON system 150 via OSS 160 and may provide the received instruction to optimization manager 550.

Furthermore, in some implementations, some SON adjustments may be selected by base station 130 (e.g., local parameters such as handover parameters, antenna tilt or direction adjustments, etc.), other SON adjustments may be selected by SON system 150 (e.g., global parameters, such as capacity optimization, etc.), and SON system interface 520 may communicate with SON system 150 via OSS 160 to determine which parameter adjustments should be determined locally by optimization manager 540 and which parameters adjustments should be determined by SON system 150.

Base station interface 520 may be configured to communicate with other base stations 130. For example, some SON parameter adjustments may be based on KPIs associated with a set of base stations 130 in a particular area, where base stations 130 in the area may communicate to determine such SON parameter adjustments using distributed computing. For example, base stations 130 may share neighbor lists, coordinate antenna tilts to reduce interference, and/or load balance traffic by handing over particular types of UE devices 110 to a particular base station 130 with a higher capacity.

KPI collector 530 may collect metric values associated with UE devices 110 attached to base station 130. For example, KPI collector 530 may collect, for a UE device 110 and for a particular time interval, information relating to location of UE device 110, a number of voice bearers associated with UE device 110, a number of video bearers associated with UE device 110, a number of users associated with UE device 110, a data throughput for UE device 110, a number of handovers for UE device 110, an average packet size for UE device 110, a variance in packet arrival times for UE device 110, a connection success rate for UE device 110, a call drop rate for UE device 110, a latency for UE device 110, a number of unique cells reported in a time period for UE device 110, a number of cells changed in a time period for UE device 110, an error rate for UE device 110, and/or other KPI values.

Optimization manager 540 may adjust SON optimization parameters for base station 130. For example, optimization manager 540 may adjust one or more of a coverage optimization parameter, an antenna tilt parameter, a power distribution parameter, a retransmission parameter, a handover parameter, a neighbor list changes parameter, a load balancing parameter, a delay optimization parameter, a carrier optimization parameter, a random access channel parameter, and/or another type of optimization parameter that may be adjusted for base station 130. In some implementations, optimization manager 540 may receive instructions from SON system 150 via OSS 160. For example, OSS interface 510 may use an API to instruct optimization manager 540 to adjust one or more SON parameters. An API call via OSS interface 510 to optimization manager 540 may include, for each SON parameter to be adjusted, a SON parameter ID and a corresponding SON parameter adjustment value.

Additionally or alternatively, optimization manager 540 may determine to adjust one or more SON parameters locally based on information obtained from KPI collector 530 and/or based on information stored in optimization DB 550. Optimization DB 550 may store information relating to optimization actions associated with particular service categories, similar to the information stored in optimization DB 330 and described above with reference to FIG. 4B. Optimization manager 540 may adjust the SON parameters for base station 130, including instructing one or more of handover manager 560, antenna manager 570, and/or load balancer 580 to perform operational parameters associated with the SON optimization determinations.

Handover manager 560 may manage handovers of UE devices 110 from base station 130 to another base station 130 and/or handovers received from other base stations 130. Handover manager 560 may maintain a set of handover parameters (e.g., an offset parameter, a hysteresis parameter, a time to trigger parameter, etc.) that are used to determine whether a particular UE device 110 should be handed over to another base station 130. Furthermore, handover manager 560 may maintain a list of neighbors identifying neighboring base stations 130.

Antenna manager 570 may manage one or more antennas associated with one or more cells of base station 130. Antenna manager 570 may perform adjustments to an antenna radiation pattern for a particular frequency band, such as, for example, mechanical tilt, remote electric tilt, auxiliary tilt, etc. Load balancer 580 may perform load balancing of traffic for base station 130. Load balancing may be performed between particular bands of base station 130, between particular cells of base station 130, and/or may include coordination of load balancing of traffic with other base stations 130.

Although FIG. 5 shows exemplary components of base station 130, in other implementations, base station 130 may include fewer components, different components, additional components, or differently arranged components than depicted in FIG. 5. Additionally or alternatively, one or more components of base station 130 may perform one or more tasks described as being performed by one or more other components of base station 130.

Figure 6:
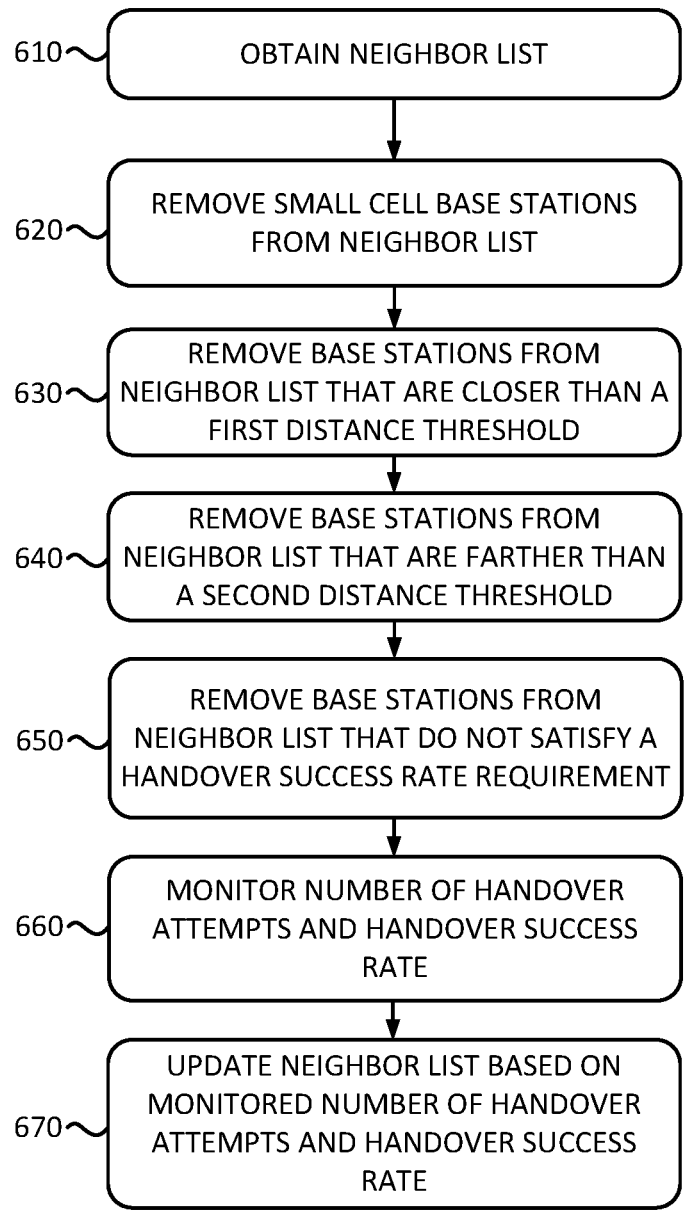
FIG. 6 is a flowchart of a process of optimizing a neighbor list according to an implementation described herein.

FIG. 6 is a flowchart of a process of optimizing a neighbor list that is used for contextual optimization. In some implementations, the process of FIG. 6 may be performed by SON system 150. In other implementations, some or all of the process of FIG. 6 may be performed by another device or a group of devices separate from SON system 150, such as base station 130 and/or OSS 160.

The process of FIG. 6 may include obtaining a neighbor list (block 610). For example, neighbor list manager 350 may obtain a neighbor list associated with a base station sector from base station 130 via OSS 160. The obtained base station list may be filtered by removing small cell base stations from the neighbor list (block 620), by removing base stations from the neighbor list that are closer than a first distance threshold (block 630), and by removing base stations from the neighbor list that are further than a second distance threshold (block 640). For example, neighbor list manager 350 may exclude small cells or other non-macro cells from the neighbor list, since small cells may be installed to improve local coverage in an area and may not significantly affect cell density or mobility in a particular area. Furthermore, neighbors that are too close may be removed because such close neighbors may not be involved in handovers. In some implementations, the first distance threshold may be set to 150 meters. In other implementations, a different value may be selected for the first distance threshold.

Neighbors that are too far away may also be removed because too many handover attempts with such neighbors may fail and thus such distant neighbors may not effectively contribute to the cell density. In some implementations, the second distance threshold may be set to 50 kilometers. In other implementations, a different value may be selected for the second distance threshold.

The obtained base station list may be further filtered by removing base stations from the neighbor list that do not satisfy a handover success rate requirement (block 650). For example, the most distant neighbor that satisfies a handover success rate may be considered the most distant good neighbor and further neighbors (which may be associated with lower handover success rates) may be removed from the list. In some implementations, the handover success rate may be used in combination with a total number of handover attempts. For example, if base station 130 is associated, within a particular time period with a handover success rate of 75% and the number of handover attempts is above 24, base station 130 may be consider a good neighbor and included on the neighbor list.

The handover success rate and number of handovers may be monitored (block 660) and the neighbor list may be updated based on the number of handover attempts and the handover success rate (block 670). For example, neighbor list manager 350 may monitor the neighbor list at particular intervals and may add neighbors if they satisfy a first requirement based on the handover success rate in combination with a number of handover attempts within a particular time period, and may remove neighbors if they satisfy a second requirement based on the handover success rate in combination with a number of handover attempts within the particular time period. As an example, if a neighbor is associated with a handover success rate of less than 50% and the number of handover attempts is at least 24, the neighbor may be removed from the list, and if base station 130 is associated with a handover success rate of at least 75% and the number of handover attempts is at least 24, base station 130 may be added to the neighbor list used for contextual optimization.

Figure 7:
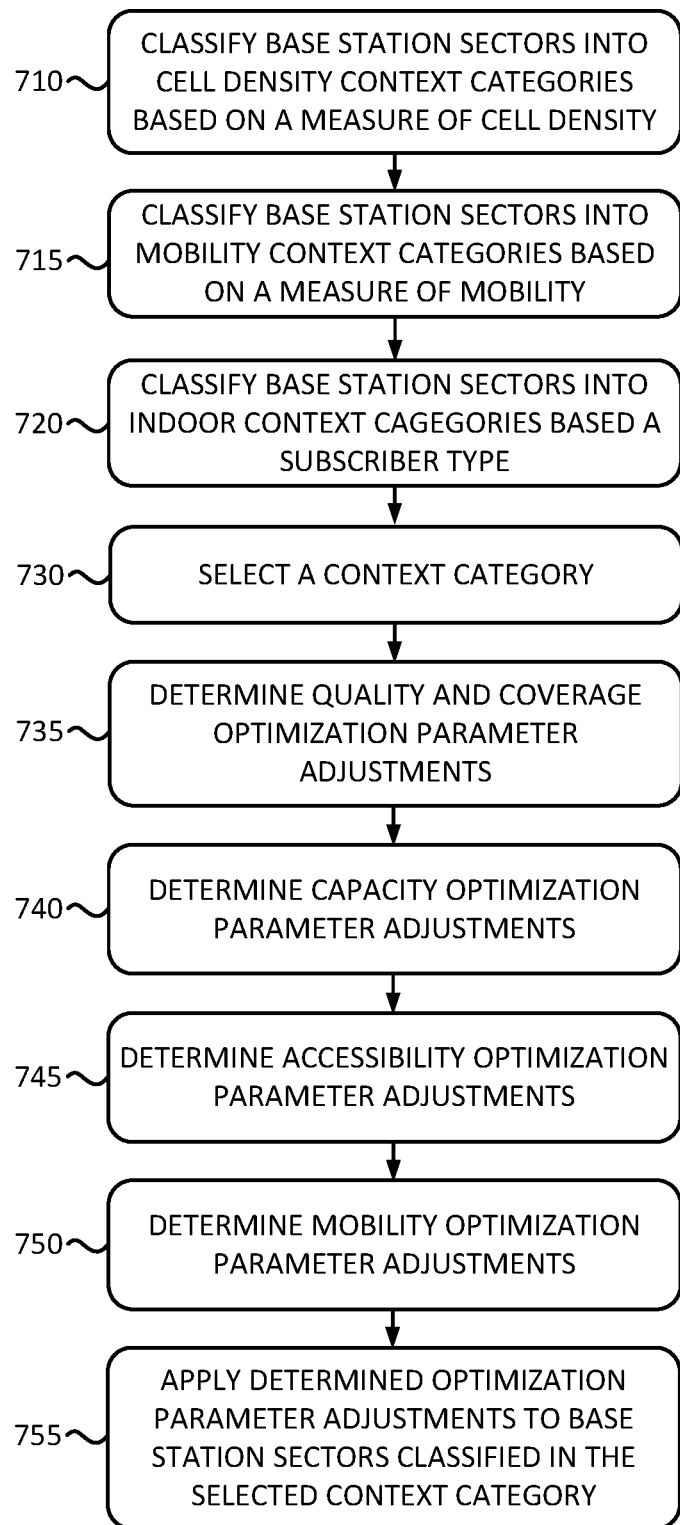
FIG. 7 is a flowchart of a process for contextual optimization according to an implementation described herein.

FIG. 7 is a flowchart of a process for contextual optimization. In some implementations, the process of FIG. 7 may be performed by SON system 150. In other implementations, some or all of the process of FIG. 7 may be performed by another device or a group of devices separate from SON system 150, such as base station 130 and/or OSS 160.

The process of FIG. 7 may include classifying base station sectors into cell density context categories based on a measure of cell density (block 710), classifying base station sectors into mobility context categories based on a measure of mobility (block 720), classifying base station sectors into indoor context categories based on a number of indoor devices (block 730), and classifying base station sectors into drone use context categories based on a number of drone devices (block 740). For example, sector classifier 340 may classify base station sectors into cell density context categories based on the number of neighbors in an optimized neighbor list, classify base station sectors into a particular mobility context category based on the number of successful handovers, classify base station sectors into an indoor context category based on pathloss information associated with UE devices 110, classify base station sectors into a drone context category based on a number of detected UE devices 110 that correspond to unmanned aerial vehicles, and/or classify base station sectors into other types of context categories.

In some implementations, cell density may additionally or alternatively be determined using a geo-grid, such as a geographical grid of hexagonal grid elements, square grid elements, triangular grid elements, and/or another type of geo-grid. The number of base stations in a particular grid element may be determined to determine the cell density for the particular grid element. If a base station sector is associated with the grid element, the cell density of the grid element may be used to assign and/or adjust a cell density to the base station sector.

A context category may be selected (block 730) and quality and coverage optimization parameter adjustments may be determined (block 735). For example, quality and coverage manager 360 may access optimization DB 330, determine the quality and coverage weights for the selected context category, and select antenna and/or power adjustments based on the determined quality and coverage weights. Quality and coverage manager 360 may optimize high density and/or low mobility context categories for quality and/or may optimize low density and/or high mobility context categories for coverage.

Furthermore, capacity optimization parameter adjustments may be determined (block 740). For example, capacity manager 370 may determine an adjustment to a cell offset parameter, such as an intra-frequency offset parameter and/or an inter-frequency offset parameter. Furthermore, capacity manager 370 may select a carrier aggregation configuration for the selected context category.

Furthermore, accessibility optimization parameter adjustments may be determined (block 745). For example, accessibility manager 380 may select a PRACH preamble based on a context category, select an RSI based on a context category, and/or select a cell radius based on a context category. Exemplary accessibility optimization is described further below with reference to FIG. 8.

Moreover, mobility optimization parameter adjustments may be determined (block 750). For example, mobility manager 390 may determine an adjustment to mobility parameter for the selected context category, such as an event handover parameter, a handover offset parameter, a handover hysteresis parameter, a handover time to trigger parameter, and/or another type of handover parameter. Mobility optimization may be particular important for a high mobility context category.

The determined optimization parameter adjustments may be applied to the base station sectors classified in the selected context category (block 755). For example, SON system 150 may select base stations 130 that are associated with base station sectors classified in the selected context category. SON system 150 may then instruct the selected base stations 130, via OSS 160, to perform the selected adjustments for the optimization parameters. Optimization manager 540 of base stations 130 may then implement the adjustments.

Some context categories may be excluded from particular types of optimization adjustments. For example, a drone use context category may be excluded from optimization adjustments and may be treated differently. Thus, if a base station sector is included in a drone use context category, optimization adjustments may not be applied to base station 130 associated with the base station sector classified in the drone use context category.

Similarly, an indoor context category may be treated differently. For example, because high frequency bands, such as AWS and PCS do not penetrate indoors, base station sectors classified in an indoor context category may be excluded from using such high frequency bands. Thus, for example, a handover threshold from AWS to PCS to a lower frequency band may be set very low for a base station sector classified in an indoor context category, causing UE devices 110 associated with the base station sector to switch to a lower frequency band.

Figure 8:
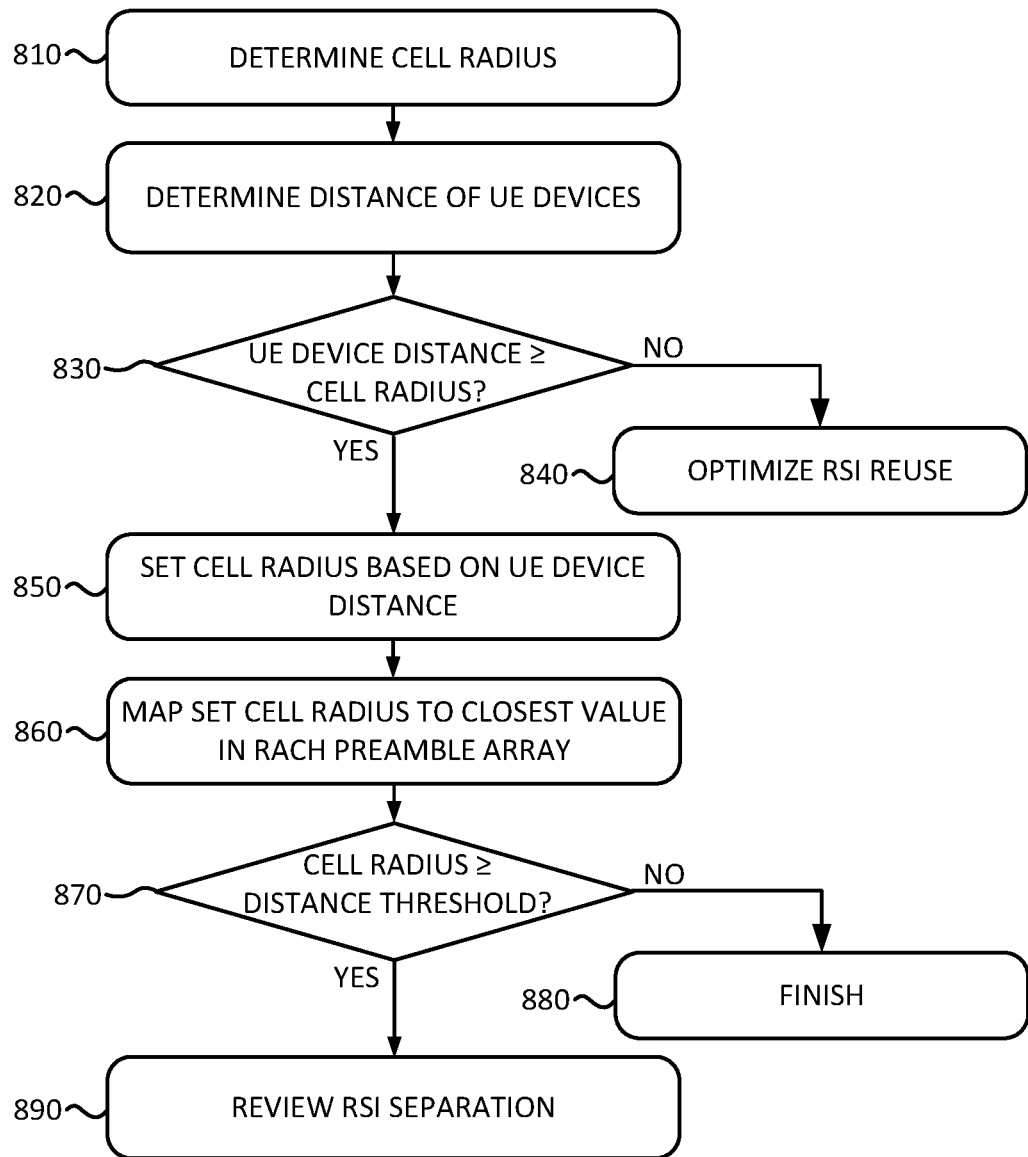
FIG. 8 is a flowchart of a process for optimizing accessibility according to an implementation described herein.

FIG. 8 is a flowchart of a process for optimizing accessibility. In some implementations, the process of FIG. 8 may be performed by SON system 150. In other implementations, some or all of the process of FIG. 8 may be performed by another device or a group of devices separate from SON system 150, such as base station 130 and/or OSS 160.

The process of FIG. 8 may include determining a cell radius (block 810), determining a distance of UE devices 110 (block 820), and determining whether the UE device distance is greater than or equal to the cell radius (block 830). For example, accessibility manager 380 may select a base station sector from sector DB 325, determine the cell radius assigned to the selected base station sector, determine the distance of the farthest UE device 110 attached to base station 130 associated with the selected base station sector, and determine whether the distance of the farthest UE device 110 is greater than or equal to the assigned cell radius. The distance of the farthest UE device 110 may be determined based on a timer that measures the amount of time it takes for signals to reach base station 130 from UE devices 110.

If it is determined that the UE device distance is not greater than or equal to the cell radius (block 830—NO), RSI reuse may be optimized (block 840). For example, accessibility manager 380 may ensure that the same RSIs are not being re-used and may select an RSI that is not in use. Furthermore, accessibility manager 380 may select an RSI based on the cell radius, by determining an optimized cell radius based on the furthest UE device distance, and mapping the optimized cell radius to the closest value in an array of RSI distance values. The RSI distance values on the array may be based on the distance associated with particular RSIs.

If it is determined that the UE device distance is greater than or equal to the cell radius (block 830—YES), the cell radius may be set based on the UE device distance (block 850) and the set cell radius may be mapped to the closest value in a RACH preamble array (block 860). For example, accessibility manager 380 may set the cell radius based on the furthest UE device distance and may map the set cell radius to the closest value in an array of RACH preamble distance values. The RACH preamble distance values on the array may be based on the distance associated with particular RACH preambles.

A determination may be made as to whether the set cell radius is greater than or equal to a distance threshold (block 870). As an example, the distance threshold may be set to 14.5 kilometers. If the set cell radius is not greater than or equal to the distance threshold (block 870—NO), the accessibility optimization may be finished (block 880). If the set cell radius is greater than or equal to the distance threshold (block 870—YES), RSI separation may be reviewed (block 890). For example, accessibility manager 380 may ensure that RSI separation is maintained between base station sectors within the cell radius. In other words, accessibility manager 380 may make sure that the neighbors of the base station sector are using different RSIs.

Figure 9:
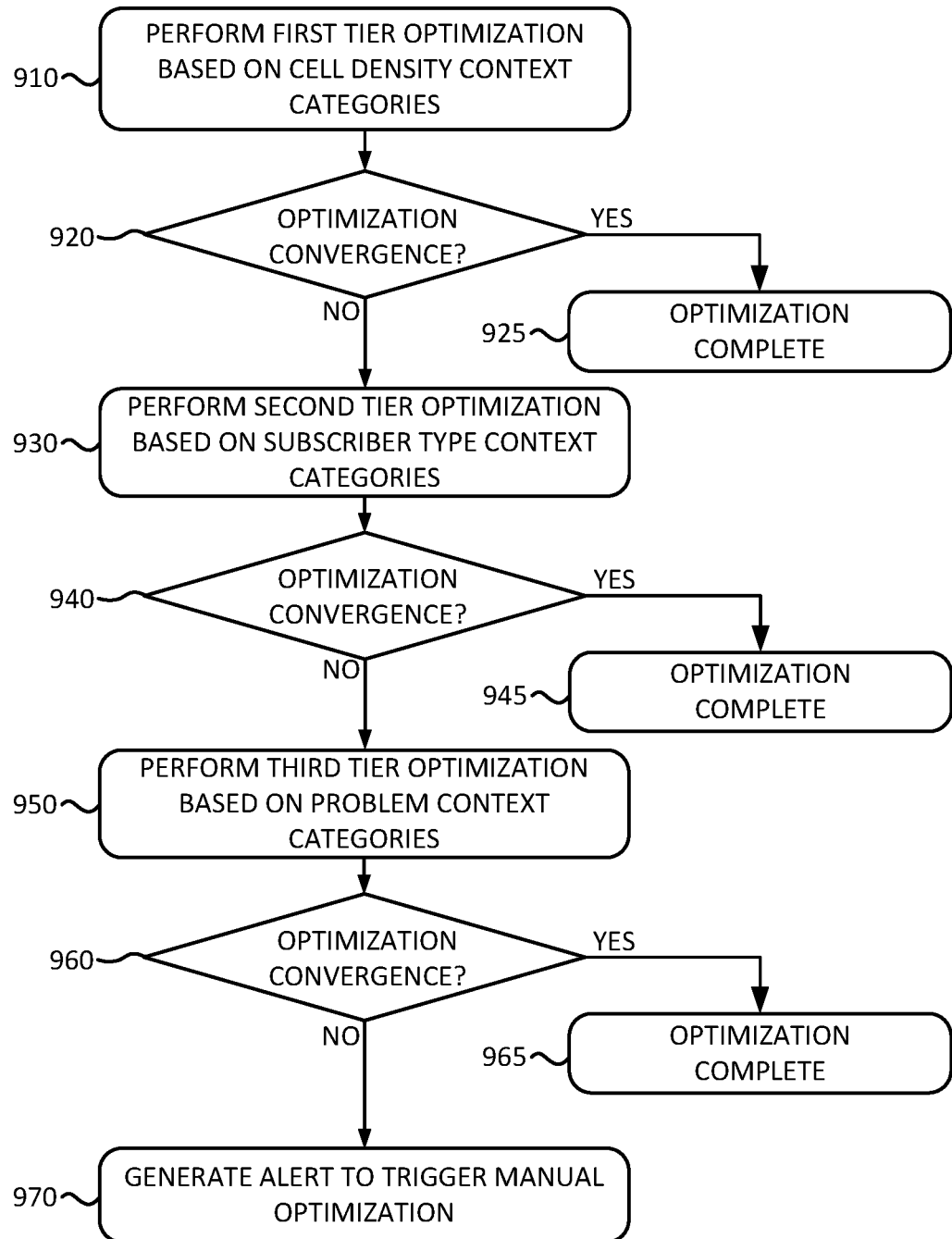
FIG. 9 is a flowchart of a process for performing tiered contextual optimization according to an implementation described herein.

FIG. 9 is a flowchart of a process for performing tiered contextual optimization according to an implementation described herein. In some implementations, the process of FIG. 9 may be performed by SON system 150. In other implementations, some or all of the process of FIG. 9 may be performed by another device or a group of devices separate from SON system 150, such as base station 130 and/or OSS 160.

The process of FIG. 9 may include performing a first tier optimization based on cell density context categories (block 910). For example, optimization manager 320 may select one or more optimization adjustments from optimization DB 330 for a base station sector based on the cell density context category associated with the base station sector in sector DB 325.

A determination may be made as to whether optimization convergence has been achieved (block 920). For example, optimization convergence may be measured by tracking one or more KPIs over a time period and/or over a particular number of optimization cycles to determine whether the one or more KPIs are improving by at least a particular rate, by measuring a KPI cost function to determine whether the KPI cost function reaches a particular threshold, and/or using a different convergence criterion.

If optimization convergence has been achieved (block 920—YES), optimization may be designated as being completed (block 925). If optimization convergence has not been achieved (block 920—NO), processing may continue to second tier optimization based on subscriber type context categories (block 930). For example, optimization manager 320 may select one or more optimization adjustments from optimization DB 330 for a base station sector based on a subscriber type context category, and/or a mobility context category, associated with the base station sector in sector DB 325.

A determination may be made as to whether optimization convergence has been achieved (block 940). If optimization convergence has been achieved (block 940—YES), optimization may be designated as being completed (block 945). If optimization convergence has not been achieved (block 940—NO), processing may continue to third tier optimization based on problem context categories (block 950). For example, optimization manager 320 may send an alert to self-healing manager 395 to perform one or more reactionary optimization processes based on a particular problem context category associated with the base station sector in sector DB 325.

A determination may be made as to whether optimization convergence has been achieved (block 960). If optimization convergence has been achieved (block 960—YES), optimization may be designated as being completed (block 965). If optimization convergence has not been achieved (block 960—NO), an alert may be generated to trigger manual optimization. For example, self-healing manager 395 may generate an alert to a technician to perform manual optimization on the base station sector to address the problem associated with the problem context category.

Figure 10A:
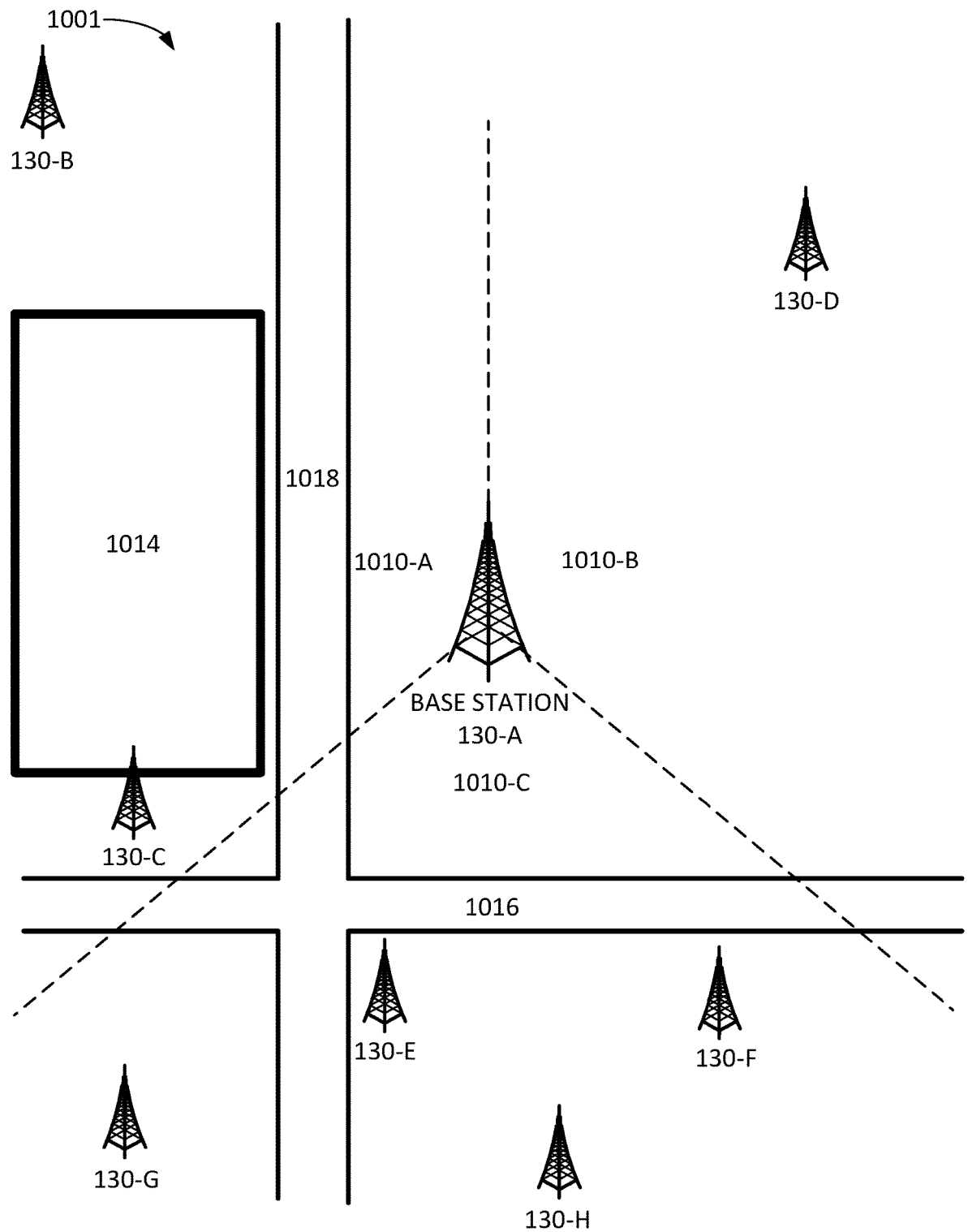

FIGS. 10A-10C are diagrams of an exemplary contextual optimization according to an implementation described herein. FIG. 10A illustrates an environment 1001 that includes a base station 130-A that is divided into three base station sectors 1010-A, 1010-B, and 1010-C. Each of the base station sectors 1010-A, 1010-B, and 1010-C may be associated with a wireless transceiver that includes an array of antennas pointed in a different direction away from base station 130-A.

Base station sector 1010-A may point in a direction toward base stations 130-B and 130-C and base stations 130-B and 130-C may be included on the neighbor list of base station sector 1010-A. Furthermore, building 1014 may be included in the area serviced by base station sector 1010-A, and a large number of UE devices 110 serviced by base station sector 1010-A may be located inside building 1014 for a significant amount of time. Base station sector 1010-B may point in a direction toward base station 130-D and base station 130-D may be included in the neighbor list of base station sector 130-B. Base station sector 1010-C may point in a direction toward base stations 130-E, 130-F, 130-G, and 130-H and base stations 130-E, 130-F, 130-G, and 130-H may be included on the neighbor list of base station sector 130-C. Moreover, a road 1016 may lead through the area serviced by base station sector 130-C and a road 1018 may lead through the area serviced by base station sector 130-B.

FIG. 10B illustrates a classification table 1002 for base station sectors 1010-A, 1010-B, and 1010-C. Classification table 1002 includes a sector column 1020, a density classification column 1022, a mobility classification column 1024, an indoor classification column 1026, and a drone use classification column 1028.

As shown in FIG. 10B, based on base stations 130-B and 130-C (and other base stations not shown in FIG. 10A) being on the neighbor list of base station sector 1010-A, base station sector 1010-A may be classified in a medium density context category. Furthermore, because UE devices 110 may be located in vehicles traveling down road 1018, frequent handovers may occur between base stations 130-B and/or 130-C and base station sector 130-A. Therefore, base station sector 1010-A may be classified in a high mobility context category. Moreover, because of building 1014, base station sector 1010-A may detect a large pathloss compared to expected pathloss values and SON system 150 may determine that the number of UE devices 110 serviced by base station sector 1010-A that are indoors exceeds a threshold and base station sector 1010-A may be classified in an indoor context category.

As shown in FIG. 10B, based on base station 130-D being on the neighbor list of base station sector 1010-A, base station sector 1010-B may be classified in a low density context category and based on a low number of handovers between base station sector 1010-B and base station 130-D, base station sector 1010-B may be classified in a low mobility context category.

As shown in FIG. 10B, based on base stations 130-E, 130-F, 130-G, and 130-H being on the neighbor list of base station sector 1010-C, base station sector 1010-C may be classified in a high density context category. Furthermore, because UE devices 110 may be located in vehicles traveling down road 1016, frequent handovers may occur between base stations 130-E and 130-F and base station sector 130-C. Therefore, base station sector 1010-C may be classified in a high mobility context category.

Furthermore, no indoor UE devices 110 may be detected for base station sectors 1010-B and 1010-C and thus base station sectors 1010-B and 1010-C may not be associated with an indoor context classification. Finally, no drone use may be detected and thus base station sectors 1010-A, 1010-B, and 1010-C may not be associated with a drone use context classification.

FIG. 10C illustrates an optimization table 1003 for base station sectors 1010-A, 1010-B, and 1010-C with respect to density context categories. As shown in FIG. 10C, optimization table 1003 may include a density row 1050 that specifies a particular density context category, a quality and coverage optimization entry 1060, a capacity optimization entry 1070, and an accessibility optimization entry 1080.

Quality and coverage optimization entry 1060 may include quality weights 1062 and coverage weights 1064 that indicate how much weight should be given to quality and how much weight should be given to coverage for optimization parameters for a context category. For example, a very high cell density context category may be associated with a quality weight of 1 and a coverage weight of 0.25, a high cell density context category may be associated with a quality weight of 1 and a coverage weight of 0.5, a medium cell density context category may be associated with a quality weight of 1 and a coverage weight of 1, and a low cell density context category may be associated with a quality weight of 0.25 and a coverage weight of 1. Thus, for example, with a quality weight of 1 and a coverage weight of 0.25, antenna tilts may be determined based on:

$$\text{weighted\_average\_adjustment} = 1 * \text{down\_tilt\_adjustment} + 0.25 * \text{up\_tilt\_adjustment}.$$

Capacity optimization entry 1070 may include offsets 1072 that determine the thresholds for handovers. For example, a high offset may determine a lower threshold for handovers, causing handovers to occur more frequently, which may be acceptable in high cell density environments. A low offset, in contrast, may determine a higher threshold for handovers, causing handovers to occur less frequently, which may be desirable in a low cell density environment.

Accessibility optimization entry 1080 may include PRACH preamble formats 1082 that determine the size of the PRACH preamble. Short PRACH preambles may be preferable for high cell density environments and long preambles may be preferable for low density cell environments, because long preambles enable UE devices 110 to access base stations 130 from further away.

FIGS. 11A and 11B are diagrams of an exemplary tiered contextual optimization according to an implementation described herein. FIG. 11A shows optimization table 1101, which may include a second tier optimization for a very high/high cell density category 1110. For example, if optimization convergence for a base station sector classified in a very high or high cell density is not achieved after performing the optimizations specified in optimization table 1003 of FIG. 10B, the optimizations based on mobility context categories shown in optimization table 1101 may be performed.

As shown in FIG. 11A, optimization table 1101 may include a mobility row 1120, a quality optimization row 1122, a coverage optimization row 1123, a capacity optimization row 1126, and a mobility optimization row 1128. Mobility row 1120 may specify particular mobility context categories, such as high/medium mobility, inter/intra frequency mobility, and drone mobility. Quality optimization row 1122 and coverage optimization row 1124 illustrate that no further quality and coverage optimizations are to be performed for these mobility context categories. Capacity optimization row 1126 indicates that a low priority capacity optimization is to be performed for an inter/intra frequency mobility context category. Mobility optimization row 1128 indicates that a high priority mobility optimization is to be performed for all the shown mobility context categories.

FIG. 11B shows optimization table 112, which may include another second tier optimization for a very high/high cell density category 1110. For example, if optimization convergence for a base station sector classified in a very high or high cell density is not achieved after performing the optimizations specified in optimization table 1003 of FIG. 10B, the optimizations based on subscriber type context categories shown in optimization table 1102 may be performed.

As shown in FIG. 11B, optimization table 1102 may include a subscriber type row 1130, a capacity optimization row 1132, an accessibility optimization row 1134, and a mobility optimization row 1136. Subscriber type row 1130 may specify particular subscriber type context categories, such as an indoor context category, an IoT context category, and an indoor and high inter-frequency mobility. An indoor and high inter-frequency mobility category may identify a base station sector in which UE devices 110 are switching from a high frequency carrier band, such as AWS, to a low frequency band as a result of entering an indoor environment.

Capacity optimization row 1126 indicates that a low priority capacity optimization is to be performed for the indoor and high inter-frequency mobility context category. Accessibility optimization row 1128 indicates that a high priority accessibility optimization is to be performed for the indoor context category. Mobility optimization row 1128 indicates that a high priority mobility optimization is to be performed for the indoor and high inter-frequency mobility context category.

After the second tier contextual optimizations shown in FIGS. 11A and 11B are performed, and optimization convergence is not achieved, a third tier contextual optimization based on problem context categories may be performed. As an example, a base station sector may be identified as a congested and low efficiency base station sector based on a spectral efficiency that is below an efficiency threshold and a call volume that is higher than a call volume threshold. In response, self-healing manager 395 may perform a further capacity optimization in order to address the congestion and low efficiency. As another example, a base station sector may be identified as a base station sector in which particular device types experience poor Voice over LTE (VoLTE) performance. In response, self-healing manager 395 may execute a process to change the VoLTE parameters for the particular device types.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIGS. 6, 7, 8, and 9, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
    classifying, by a computer device, a plurality of base station sectors, associated with a plurality of base stations, into a plurality of context categories, wherein each base station of the plurality of base stations services multiple base station sectors of the plurality of base station sectors;
    selecting, by the computer device, a context category from the plurality of context categories, wherein the context category includes a cell density context category relating to a density of base stations in a geographic area based on an inter-site distance between the base stations, a mobility context category relating to how mobile user devices associated with a base station sector are, and a subscriber type context category that identifies whether at least a fraction of subscribers serviced by the base station sector correspond to a designated subscriber type;
    determining, by the computer device, an optimization parameter adjustment for a subset of base station sectors, of the plurality of base station sectors, classified in the selected context category, wherein the optimization parameter adjustment adjusts at least one of a coverage, a quality, a capacity, or an accessibility parameter; and
    instructing, by the computer device, base stations associated with the subset of base station sectors to implement the determined optimization parameter adjustment.

2. The method of claim 1, wherein classifying the plurality of base station sectors into the plurality of context categories includes:
    selecting a base station sector of the plurality of base station sectors;
    determining a number of neighbors associated with the selected base station sector;
    determining a cell density classification for the selected base station sector based on the determined number of neighbors; and
    determining a context category of the plurality of context categories for the selected base station sector based on the determined cell density classification.

3. The method of claim 2, wherein determining the number of neighbors associated with the selected base station sector includes:
    obtaining a neighbor list associated with the selected base station sector;
    filtering the neighbor list by removing neighbors associated with a distance that is less than a first distance threshold or greater than a second distance threshold and by removing any neighbors associated with a handover success rate that is less than a handover success rate threshold; and
    determining the number of neighbors based on the filtered neighbor list.

4. The method of claim 1, wherein classifying the plurality of base station sectors into the plurality of context categories includes:
    selecting a base station sector of the plurality of base station sectors;
    determining a number of handovers associated with the selected base station sector;
    determining a mobility classification for the selected base station sector based on the determined number of handovers; and
    determining a context category of the plurality of context categories for the selected base station sector based on the determined mobility classification.

5. The method of claim 1, wherein classifying the plurality of base station sectors into the plurality of context categories includes:
    selecting a base station sector of the plurality of base station sectors;
    determining a portion of user equipment (UE) devices, associated with the selected base station sector, that are located indoors based on pathloss values associated with the UE devices;
    determining that the portion of UE devices that are located indoors is greater than an indoor portion threshold; and
    classifying the selected base station sector in an indoor context category based on determining that the portion of UE devices that are located indoors is greater than the indoor portion threshold.

6. The method of claim 1, wherein determining the optimization parameter adjustment for the subset of base station sectors, of the plurality of base station sectors, classified in the selected context category includes:
    determining a coverage and quality optimization parameter adjustment for the subset of base station sectors, of the plurality of base station sectors, classified in the selected context category, based on a coverage and quality requirement associated with the selected context category, and wherein determining a coverage and quality optimization parameter adjustment for the subset of base station sectors includes:
        selecting the coverage and quality optimization parameter adjustment to improve signal quality, when the selected context category corresponds to a high density context category; and
        selecting the coverage and quality optimization parameter adjustment to improve signal coverage, when the selected context category corresponds to a low density context category, wherein the high density context category is associated with a higher base station density than the low density context category.

7. The method of claim 1, wherein determining the optimization parameter adjustment for the subset of base station sectors, of the plurality of base station sectors, classified in the selected context category includes:
    determining a coverage and quality optimization parameter adjustment for the subset of base station sectors, of the plurality of base station sectors, classified in the selected context category, based on a coverage and quality requirement associated with the selected context category, and wherein determining the coverage and quality optimization parameter adjustment for the subset of base station sectors includes:
        selecting the coverage and quality optimization parameter adjustment to improve signal coverage, when the selected context category corresponds to a high mobility context category; and
        selecting the coverage and quality optimization parameter adjustment to improve signal quality, when the selected context category corresponds to a low mobility context category, wherein the high mobility context category is associated with a higher handover rate than the low mobility context category.

8. The method of claim 1, wherein determining the optimization parameter adjustment for the subset of base station sectors, of the plurality of base station sectors, classified in the selected context category includes:
    determining a coverage and quality optimization parameter adjustment for the subset of base station sectors, of the plurality of base station sectors, classified in the selected context category, based on a coverage and quality requirement associated with the selected context category, and wherein determining the coverage and quality optimization parameter adjustment for the subset of base station sectors includes:
        selecting a down tilt adjustment for an antenna to improve quality; or
        selecting an up tilt adjustment for the antenna to improve coverage.

9. The method of claim 1, wherein determining the optimization parameter adjustment for the subset of base station sectors, of the plurality of base station sectors, classified in the selected context category includes:
    determining a capacity optimization parameter adjustment for the subset of base station sectors based on a capacity requirement associated with the selected context category; and
    wherein determining the capacity optimization parameter adjustment for the subset of base station sectors includes at least one of:
        selecting an intra-frequency cell offset based on the selected context category;
        selecting an inter-frequency cell offset based on the selected context category; or
        selecting a carrier aggregation configuration based on the selected context category.

10. The method of claim 1, wherein determining the optimization parameter adjustment for the subset of base station sectors, of the plurality of base station sectors, classified in the selected context category includes:
    determining a capacity optimization parameter adjustment for the subset of base station sectors based on a capacity requirement associated with the selected context category; and
    wherein determining the capacity optimization parameter adjustment for the subset of base station sectors includes at least one of:
        selecting a high cell offset, when the selected context category corresponds to a high density context category; and selecting a low cell offset, when the selected context category corresponds to a low density context category, wherein the high cell offset is higher than the low cell offset, and wherein the high density context category is associated with a higher base station density than the low density context category.

11. The method of claim 1, wherein determining the optimization parameter adjustment for the subset of base station sectors, of the plurality of base station sectors, classified in the selected context category includes:
determining a capacity optimization parameter adjustment for the subset of base station sectors based on a capacity requirement associated with the selected context category; and
wherein determining the capacity optimization parameter adjustment for the subset of base station sectors includes at least one of:
selecting a low handover threshold for handovers from a high frequency band to a low frequency band, wherein the high frequency band is associated with higher frequencies than the low frequency band, when the selected context category corresponds to a high density context category; and
selecting a high handover threshold for handovers from the high frequency band to the low frequency band, when the selected context category corresponds to a low density context category, wherein the high handover threshold is higher than the low handover threshold, and wherein the high density context category is associated with a higher base station density than the low density context category.

12. The method of claim 1, wherein determining the optimization parameter adjustment for the subset of base station sectors, of the plurality of base station sectors, classified in the selected context category includes:
determining an accessibility optimization parameter adjustment for the subset of base station sectors based on an accessibility requirement associated with the selected context category; and wherein determining the accessibility optimization parameter adjustment for the subset of base station sectors includes at least one of:
selecting a physical random access channel (PRACH) preamble based on the selected context category;
selecting a root sequence index (RSI) based on the selected context category; or
selecting a cell radius based on the selected context category.

13. The method of claim 1, wherein determining the optimization parameter adjustment for the subset of base station sectors, of the plurality of base station sectors, classified in the selected context category includes:
determining an accessibility optimization parameter adjustment for the subset of base station sectors based on an accessibility requirement associated with the selected context category; and wherein determining the accessibility optimization parameter adjustment for the subset of base station sectors includes at least one of:
selecting a short time physical random access channel (PRACH) preamble, when the selected context category corresponds to a high density context category; and
selecting a long time PRACH preamble, when the selected context category corresponds to a low density context category, wherein the short time PRACH preamble takes a shorter time to transmit than the long time PRACH preamble, and wherein the high density context category is associated with a higher base station density than the low density context category.

14. The method of claim 1, further comprising:
determining at least one handover parameter adjustment for the subset of base station sectors based on the selected context category; and
instructing base stations associated with the subset of base station sectors to implement the at least one handover parameter adjustment.

15. A device comprising:
a memory configured to store instructions; and
a processor configured to execute the instructions to:
classify a plurality of base station sectors, associated with a plurality of base stations, into a plurality of context categories, wherein each base station of the plurality of base stations services multiple base station sectors of the plurality of base station sectors;
select a context category from the plurality of context categories, wherein the context category includes a cell density context category relating to a density of base stations in a geographic area based on an inter-site distance between the base stations, a mobility context category relating to how mobile user devices associated with a base station sector are, and a subscriber type context category that identifies whether at least a fraction of subscribers serviced by the base station sector correspond to a designated subscriber type;
determine an optimization parameter adjustment for a subset of base station sectors, of the plurality of base station sectors, classified in the selected context category, wherein the optimization parameter adjustment adjusts at least one of a coverage, a quality, a capacity, or an accessibility parameter; and
instruct base stations associated with the subset of base station sectors to implement the determined optimization parameter adjustment.

16. The device of claim 15, wherein, when classifying the plurality of base station sectors into the plurality of context categories, the processor is further configured to:
select a base station sector of the plurality of base station sectors;
determine a number of neighbors associated with the selected base station sector;
determine a cell density classification for the selected base station sector based on the determined number of neighbors; and
determine a context category of the plurality of context categories for the selected base station sector based on the determined cell density classification.

17. The device of claim 16, wherein, when determining the number of neighbors associated with the selected base station sector, the processor is further configured to:
obtain a neighbor list associated with the selected base station sector;
filter the neighbor list by removing neighbors associated with a distance that is less than a first distance threshold or greater than a second distance threshold and by removing neighbors associated with handover success rate that is less than a handover success rate threshold; and
determine the number of neighbors based on the filtered neighbor list.

18. The device of claim 15, wherein, when determining the optimization parameter adjustment for the subset of base station sectors, of the plurality of base station sectors, classified in the selected context category, the processor is further configured to:
- determine a capacity optimization parameter adjustment for the subset of base station sectors based on a capacity requirement associated with the selected context category; and
- wherein, when determining the capacity optimization parameter adjustment for the subset of base station sectors, the processor is further configured to:
  - select an intra-frequency cell offset based on the selected context category;
  - select an inter-frequency cell offset based on the selected context category; or
  - select a carrier aggregation configuration based on the selected context category.

19. The device of claim 15, wherein, when determining the optimization parameter adjustment for the subset of base station sectors, of the plurality of base station sectors, classified in the selected context category the processor is further configured to:
- determine an accessibility optimization parameter adjustment for the subset of base station sectors, and wherein, when determining the accessibility optimization parameter adjustment for the subset of base station sectors, the processor is further configured to:
  - select a physical random access channel (PRACH) preamble based on the selected context category;
  - select a root sequence index (RSI) based on the selected context category; or
  - select a cell radius based on the selected context category.

20. A system comprising:
- a base station configured to provide a wireless connection to a wireless communication device; and
- a network device configured to:
  - classify a plurality of base station sectors, associated with a plurality of base stations, into a plurality of context categories, wherein each base station of the plurality of base stations services multiple base station sectors of the plurality of base station sectors;
  - select a context category from the plurality of context categories, wherein the context category includes a cell density context category relating to a density of base stations in a geographic area based on an inter-site distance between the base stations, a mobility context category relating to how mobile user devices associated with a base station sector are, and a subscriber type context category that identifies whether at least a fraction of subscribers serviced by the base station sector correspond to a designated subscriber type;
  - determine an optimization parameter adjustment for a subset of base station sectors, of the plurality of base station sectors, classified in the selected context category, wherein the optimization parameter adjustment adjusts at least one of a coverage, a quality, a capacity, or an accessibility parameter; and
  - instruct the base station to implement the determined optimization parameter adjustment.

* * * * *